US012373425B1

United States Patent
Rai et al.

(10) Patent No.: US 12,373,425 B1
(45) Date of Patent: Jul. 29, 2025

(54) NATURAL LANGUAGE QUERY GENERATION FOR FEATURE STORES USING ZERO SHOT LEARNING

(71) Applicant: Oracle International Corporation, Redwood Shores, CA (US)

(72) Inventors: Harsh Vardhan Rai, Bangalore (IN); Kshitiz Lohia, Rewari (IN); Divyank Gupta, Bengaluru (IN); Srikanta Prasad Sondekoppam Vijayashankar, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/643,594

(22) Filed: Apr. 23, 2024

(51) Int. Cl.
*G06F 16/242* (2019.01)
*G06F 16/2452* (2019.01)
*G06F 16/248* (2019.01)

(52) U.S. Cl.
CPC .... *G06F 16/2423* (2019.01); *G06F 16/24522* (2019.01); *G06F 16/248* (2019.01)

(58) Field of Classification Search
CPC ........... G06F 16/2423; G06F 16/24522; G06F 16/248
See application file for complete search history.

(56) References Cited

U.S. PATENT DOCUMENTS

| 12,027,238 B2 * | 7/2024 | Erez | G16B 30/00 |
| 2015/0310862 A1 * | 10/2015 | Dauphin | G06F 40/30 |
| | | | 704/257 |
| 2017/0206577 A1 * | 7/2017 | Hunsaker | G06F 30/15 |
| 2019/0303703 A1 * | 10/2019 | Kumar | G06V 10/82 |
| 2021/0049158 A1 * | 2/2021 | Jiao | G06F 16/243 |

(Continued)

FOREIGN PATENT DOCUMENTS

CN 116561184 B 11/2023

OTHER PUBLICATIONS

"Feature Stores and LLMs-langchain", Langchain, Available online at: https://blog.langchain.dev/feature-stores-and-llms/, May 9, 2023, pp. 1-8.

(Continued)

*Primary Examiner* — Jorge A Casanova
(74) *Attorney, Agent, or Firm* — Kilpatrick Townsend & Stockton LLP

(57) ABSTRACT

The present disclosure pertains to natural language techniques for querying data stored in feature stores using zero shot learning. In a particular aspect, a computer-implemented method includes receiving a natural language query for retrieving features from a feature store, generating an input prompt by appending a script to the natural language query, and then using a large language model to determine tables or databases from the feature store that are relevant to the natural language query, retrieve metadata for the tables or databases from the feature store, determine feature groups comprising features relevant to the natural language query, and generate a programming language query based on the input prompt, the metadata, and the groups. A list of features within the feature groups that are accessible within the feature store may then be retrieved by executing the programming language query on the feature store.

20 Claims, 13 Drawing Sheets

(56) References Cited

U.S. PATENT DOCUMENTS

| | | | |
|---|---|---|---|
| 2021/0090694 A1* | 3/2021 | Colley | G16B 30/00 |
| 2021/0118136 A1* | 4/2021 | Hassan-Shafique | G16B 20/20 |
| 2021/0191926 A1 | 6/2021 | Izenson et al. | |
| 2022/0076164 A1 | 3/2022 | Conort et al. | |
| 2023/0035639 A1 | 2/2023 | Zhao et al. | |
| 2023/0297878 A1 | 9/2023 | Tchankotadze et al. | |
| 2023/0418833 A1* | 12/2023 | Gambhir | G06F 16/25 |
| 2024/0265281 A1* | 8/2024 | Hart | G06F 40/58 |
| 2024/0362209 A1* | 10/2024 | Almaer | G06F 16/2433 |
| 2024/0419726 A1* | 12/2024 | Jenni | G06F 16/535 |
| 2025/0086213 A1* | 3/2025 | Dilipkumar | G06F 16/24522 |

OTHER PUBLICATIONS

"Integrate Modern Data Architectures with Generative AI and Interact Using Prompts for Querying SQL Databases & APIs", Available online at: https://github.com/aws-samples/amazon-sagemaker-genai-datamesh/blob/main/blogs/Simple-text-to-sql/mda_with_llm_langchain_byo_model_without_cloudformation.ipynb, Retrieved from internet on Mar. 13, 2024, pp. 1-10.

"Invoke Bedrock Model for SQL Query Generation", Available online at: https://github.com/aws-samples/amazon-bedrock-workshop/blob/main/06_CodeGeneration/01_sql_query_generate_w_bedrock.ipynb, Retrieved from internet on Mar. 13, 2024, pp. 1-6.

"Personalizing LLMs with a Feature Store", Open Data Science Conference, Available online at: https://odsc.com/speakers/personalizing-llms-with-a-feature-store/, 2024, 4 pages.

Aslett, "Databricks Utilizes Unity Catalog to Support Generative AI Development", Ventana Research Analyst Perspectives, Available online at: https://mattaslett.ventanaresearch.com/databricks-utilizes-unity-catalog-to-support-generative-ai-development, Oct. 17, 2023, pp. 1-10.

Cui, et al., "Personalize your Generative AI Applications with Amazon SageMaker Feature Store", Amazon Web Services Machine Learning Blog, Available online at: https://aws.amazon.com/blogs/machine-learning/personalize-your-generative-ai-applications-with-amazon-sagemaker-feature-store/, Oct. 6, 2023, pp. 1-10.

Panda, et al., "Build a Robust Text-to-SQL Solution Generating Complex Queries, Self Correcting, and Querying Diverse Data Sources", Amazon Web Services Machine Learning Blog, Available online at: https://aws.amazon.com/blogs/machine-learning/build-a-robust-text-to-sql-solution-generating-complex-queries-self-correcting-and-querying-diverse-data-sources/, Feb. 28, 2024, pp. 1-11.

Ren, et al., "Neural Graph Reasoning: Complex Logical Query Answering Meets Graph Databases", Available online at: https://arxiv.org/pdf/2303.14617.pdf, Mar. 26, 2023, 65 pages.

Skeels, "Blizzard: A Lightweight, Yet Powerful ML Feature System for Prototyping and v1 Use Cases", Cash App AI Blog, Available online at: https://ai.cash.app/blizzard, Jun. 20, 2023, pp. 1-16.

* cited by examiner

```
from ads.feature_store.common.enums import JoinType
query = (
    feature_group_flights.select()
    .join(feature_group_airlines.select(), left_on=['ORIGIN_AIRPORT'], right_on=['IATA_CODE'], join_type=JoinType.LEFT)
    .join(feature_group_airports.select(), left_on=['AIRLINE'], right_on=['IATA_CODE'], join_type=JoinType.LEFT)
)
query.show(5)
query.to_string()
```

305

> Entering new AgentExecutor chain...
INFO:httpx:HTTP Request: POST https://api.openai.com/v1/chat/completions "HTTP/1.1 200 OK"
Action: list_databases_sql_db
Action Input:
Observation: D815434D7A84C371224EE5B53719E870

FIG. 5B

Thought:INFO:httpx:HTTP Request: POST https://api.openai.com/v1/chat/completions "HTTP/1.1 200 OK"
Since there is only one database, I will list the tables in this database to find the one that might contain information about airports and security delays.
Action: list_tables_sql_db
Action Input: D815434D7A84C371224EE5B53719E870
Observation: airlines_feature_group, airport_feature_group, flights_feature_group

FIG. 5C

Thought:INFO:httpx:HTTP Request: POST https://api.openai.com/v1/chat/completions "HTTP/1.1 200 OK"
The table that is most likely to have data on security delays is the 'flights_feature_group'. I will now retrieve the schema for this table to confirm if it contains the necessary columns for calculating average security delays and airport full names.
Action: schema_sql_table
Action Input: D815434D7A84C371224EE5B53719E870.flights_feature_group
Observation: Table D815434D7A84C371224EE5B53719E870.flights_feature_group has columns: YEAR of type string, MONTH of type string, DAY of type string, DAY_OF_WEEK of type string, AIRLINE of type string, FLIGHT_NUMBER of type string, TAIL_NUMBER of type string, ORIGIN_AIRPORT of type string, DESTINATION_AIRPORT of type string, SCHEDULED_DEPARTURE of type string, DEPARTURE_TIME of type string, DEPARTURE_DELAY of type string, TAXI_OUT of type string, WHEELS_OFF of type string, SCHEDULED_TIME of type string, ELAPSED_TIME of type string, AIR_TIME of type string, DISTANCE of type string, WHEELS_ON of type string, TAXI_IN of type string, SCHEDULED_ARRIVAL of type string, ARRIVAL_TIME of type string, ARRIVAL_DELAY of type string, DIVERTED of type string, CANCELLED of type string, CANCELLATION_REASON of type string, AIR_SYSTEM_DELAY of type string, SECURITY_DELAY of type string, AIRLINE_DELAY of type string, LATE_AIRCRAFT_DELAY of type string, WEATHER_DELAY of type string

FIG. 5D

Thought:INFO:httpx:HTTP Request: POST https://api.openai.com/v1/chat/completions "HTTP/1.1 200 OK"
The 'flights_feature_group' table contains the column 'SECURITY_DELAY' which can be used to calculate the average security delays. However, it seems there is no column containing the full names of the airports. The table 'airport_feature_group' should contain the airport names. I will need to check the schema of the 'airport_feature_group' table to find the full names of the airports and join this table with the 'flights_feature_group' on appropriate keys to rank airports by their average security delays.
Action: schema_sql_table
Action Input: D815434D7A84C371224EE5B53719E870.airport_feature_group
Observation: Table D815434D7A84C371224EE5B53719E870.airport_feature_group has columns: IATA_CODE of type string, AIRPORT of type string, CITY of type string, STATE of type string, COUNTRY of type string, LATITUDE of type double, LONGITUDE of type double

FIG. 5E

NATURAL LANGUAGE QUERY GENERATION FOR FEATURE STORES USING ZERO SHOT LEARNING

FIELD

The present disclosure relates generally to feature stores, and more particularly, to natural language techniques for querying data stored in feature stores using zero shot learning.

BACKGROUND

A feature store serves as a centralized repository designed to manage the lifecycle of data features utilized in machine learning (ML) and data science workflows. In essence, it acts as a sophisticated catalog, housing a diverse array of features that are instrumental in training and evaluating ML models. These features encapsulate various aspects of the data, ranging from simple attributes such as numerical values or categorical labels to more intricate representations derived from complex computations or external data sources.

Within the landscape of ML and data science, feature stores play a pivotal role in facilitating efficient and scalable model development. They streamline the process of accessing, organizing, and maintaining features, thereby alleviating the burden on data scientists and ML engineers. By providing a unified platform for feature management, feature stores promote consistency and reusability across projects and teams. This not only enhances productivity but also fosters collaboration and knowledge sharing within organizations.

Furthermore, feature stores empower practitioners to leverage advanced techniques for feature engineering and experimentation. They offer capabilities for versioning, monitoring, and tracking the performance of features over time, enabling iterative refinement and optimization of ML models. Additionally, feature stores facilitate seamless integration with ML pipelines and deployment environments, ensuring smooth transitions from prototyping to production.

Consequently, feature stores represent a crucial infrastructure component in the modern ML and data science ecosystem. By streamlining feature management and promoting best practices in experimentation and deployment, they empower organizations to harness the full potential of their data assets and drive actionable insights at scale.

SUMMARY

Techniques disclosed herein introduce a transformative approach to querying data stored in feature stores by leveraging the power of natural language processing (NLP).

In various embodiments, a computer-implemented method is provided that includes receiving, from a user, a natural language query for retrieving features from a feature store; generating an input prompt by appending text identifying the feature store to the natural language query; determining, by a large language model (LLM), one or more tables or databases from the feature store that are relevant to the natural language query based on the input prompt; retrieving, by the LLM, metadata for the one or more tables or databases from the feature store; determining, by the LLM, one or more feature groups comprising features relevant to the natural language query based on the metadata; generating, by the LLM, a programming language query based on the input prompt, the metadata, and the one or more feature groups; retrieving a list of features within the one or more feature groups that are accessible within the feature store by executing the programming language query on the feature store; and outputting the list of features to the user.

In some embodiments, computer-implemented method further includes training, validating, or implementing a machine learning model based on all or a portion of the features in the list of features; or retrieving a set of data from a database based on the list of features, and training, validating, or implementing a machine learning model using the set of data.

In some embodiments, the text appended to the input prompt is a script that comprises: identification of the LLM, identification of the feature store, and identification of a generator module that is implemented as part of the LLM and used to orchestrate the extraction of the one or more tables or databases and metadata from the feature store.

In some embodiments, the generator module comprises an algorithm or series of functional steps that are executed by the LLM to determine the one or more tables or databases from the feature store, retrieve the metadata for the one or more tables or databases from the feature store, and determining the one or more feature groups.

In some embodiments, executing the algorithm or series of functional steps comprises: executing a first function that generates and executes, via a query runner function, one or more database queries on one or more databases for retrieval of a list of databases available within the feature store, the list of databases comprising the one or more databases; executing a second function that generates and executes, via the query runner function, one or more table queries on the one or more databases for retrieval of a list of tables available within the one or more databases, wherein the tables represent feature groups and/or datasets available within the one or more databases and the list of tables comprise the one or more tables; executing a third function that generates and executes, via the query runner function, one or more table queries on the tables for retrieval of information about the tables and a list of features within each of the feature groups and/or datasets.

In some embodiments, the first function also gathers information about the databases, including the databases' structure, the metadata, and schemas, and wherein the third function also gathers information about the tables, including the tables' metadata and schemas.

In some embodiments, the programming language query is generated based on the input prompt, the metadata and the schemas for the databases, the metadata and schema for the tables, and the one or more feature groups.

In various embodiments, a computer system is provided that includes one or more processors and one or more computer-readable media storing instructions that, when executed by the one or more processors, cause the one or more processors to perform part or all of the operations and/or methods disclosed herein.

In various embodiments, one or more non-transitory computer-readable media are provided that store instructions that, when executed by one or more processors of a computer system, cause the one or more processors to perform part or all of the operations and/or methods disclosed herein.

The techniques described herein may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIGS. 5B-5E show examples of outputs, actions, and observation being made by a LLM and the generator module according to various embodiments.

DETAILED DESCRIPTION

Figure 1:
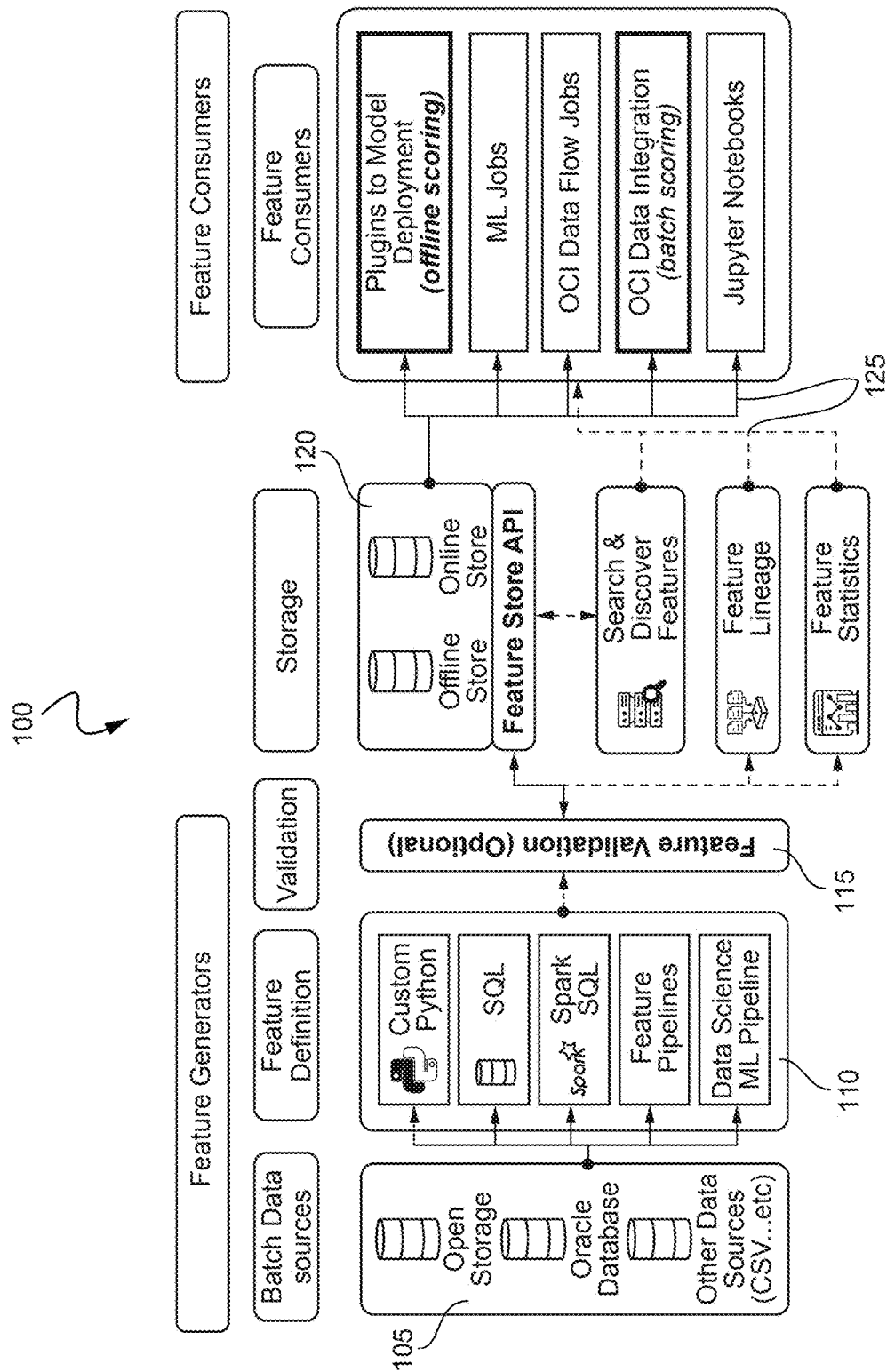
FIG. 1 is a simplified block diagram of a feature management system for ingesting, storing and serving features via a feature store according to various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

I. Introduction

Feature stores play a crucial role in the landscape of machine learning and data science by offering a structured approach to managing the lifecycle of features essential for model training and evaluation. Central to their functionality is the capability to ingest, organize, and maintain features efficiently. By consolidating features in a feature store, organizations can streamline the process of discovering relevant features and foster a culture of reusability across different projects and teams. This not only enhances productivity but also promotes consistency and reliability in model development.

Despite the benefits they provide, accessing and querying data within feature stores can present significant challenges, particularly for users with limited technical proficiency. Traditional methods often require users to possess a deep understanding of the underlying data schema and expertise in specialized query languages. Crafting complex queries to extract the desired information can be a daunting task, consuming valuable time and resources. This barrier can impede the accessibility of feature stores, limiting their potential impact across organizations and hindering the democratization of machine learning capabilities.

To address the accessibility and usability challenges associated with querying data in feature stores, there is a growing demand for more intuitive and user-friendly solutions. Simplified interfaces and tools that abstract away the complexities of underlying data structures and query languages are becoming increasingly sought after. By providing users with intuitive means to explore and retrieve data from feature stores, these solutions empower a broader range of stakeholders to leverage the wealth of information stored within the system, driving innovation and accelerating the development of machine learning applications.

The techniques described herein specifically address these challenges and others by introducing a transformative approach to querying data stored in feature stores. This approach distinguishes itself from traditional methods for accessing and querying feature data by utilizing one or more of the following aspects:

- Leveraging Natural Language: Unlike traditional methods that require knowledge of complex query languages, This approach allows users to formulate queries using natural language expressions. This significantly lowers the barrier to entry and enables users with varying technical backgrounds to easily access and utilize valuable data stored in feature stores.

- Advanced Prompting: This approach utilizes advanced prompting techniques to guide the underlying Large Language Model (LLM) towards behaving like a Feature Store Query Language (e.g., SQL) query generator. This allows the LLM to leverage its natural language understanding capabilities to translate user intent into accurate and efficient queries, even for complex information requests.

- Exploiting Feature Store Tools: This approach integrates seamlessly with the feature store's built-in tools and schema information. This allows the LLM to access and utilize the feature store's inherent capabilities, such as data type identification, entity recognition, and relationship analysis, to ensure the generated queries are optimized for performance and accuracy.

- Zero Shot Learning: This approach goes beyond simply translating prompts into instructions. It actively utilizes the LLM's natural language capabilities and feature store integration to generate optimized Query Language queries, catering specifically to the unique data structure and query requirements within a feature store environment.

By leveraging the power of natural language processing (NLP), users can formulate queries using everyday language expressions, drastically simplifying the process and removing the barrier of technical expertise. This eliminates the need for intricate knowledge of the underlying data schema or mastery of complex query languages, making feature stores more accessible and empowering a wider range of users to unlock their full potential.

Moreover, this approach goes beyond simply translating natural language into formal queries. It leverages the schema information associated with the data in the feature store to understand the user's intent and translate it into an accurate and efficient query. This ensures that users receive the precise data they need, regardless of their technical background. This represents a significant leap forward in the field of feature stores, democratizes access to valuable data, empowers users with diverse skillsets, and paves the way for an era of intuitive and efficient data exploration within the realm of machine learning and data science.

In one embodiment, a computer-implemented method is provided for that comprises: receiving, from a user, a natural language query for retrieving features from a feature store; generating an input prompt by appending text identifying the feature store to the natural language query; determining, by a large language model (LLM), one or more tables or databases from the feature store that are relevant to the natural language query based on the input prompt; retrieving, by the LLM, metadata for the one or more tables or databases from the feature store; determining, by the LLM, one or more feature groups comprising features relevant to the natural language query based on the metadata; generating, by the LLM, a programming language query based on the input prompt, the metadata, and the one or more feature groups; retrieving a list of features within the one or more feature groups that are accessible within the feature store by executing the programming language query on the feature store; and outputting the list of features to the user.

As used herein, when an action is "based on" something, this means the action is based at least in part on at least a part of the something.

As used herein, the terms "similarly", "substantially," "approximately" and "about" are defined as being largely but not necessarily wholly what is specified (and include wholly what is specified) as understood by one of ordinary skill in the art. In any disclosed embodiment, the term "similarly", "substantially," "approximately," or "about" may be substituted with "within [a percentage] of" what is specified, where the percentage includes 0.1, 1, 5, and 10 percent.

II. Feature Store

Managing many datasets, data sources, and transformations for machine learning is complex and costly. Poorly cleaned data, data issues, bugs in transformations, data drift, and training serving skew all lead to increased model development time and poor model performance. A feature store solves many of the problems because it is a centralized way to transform and access data for training and serving time, and the feature store helps define a pipeline for ingestion of data and querying of data.

FIG. 1 is a simplified block diagram of a feature management system 100 for ingesting, storing and serving features via a feature store according to various embodiments. The feature store can be a stack-based solution that is deployed in a tenancy of user (e.g., tenancy of a cloud computing environment such as infrastructure as a service (IaaS) described herein in further detail) using a resource manager (e.g., an Oracle Cloud Infrastructure (OCI) resource manage provided by the present assignee). The feature store serves as a centralized repository designed to manage the lifecycle of data features utilized in machine learning (ML) and data science workflows. In the context of a feature store, a feature refers to a specific piece of data or attribute that is used as input in ML and data science models. Features are essentially the building blocks upon which these models are trained and evaluated. They represent distinct characteristics or properties of the data that can be analyzed and processed to make predictions or derive insights. In some instances, a feature is an individual measurable property or characteristic of an event (e.g., a transaction) being observed.

Features can come from various sources 105 and take different forms, depending on the nature of the data and the requirements of the ML problem at hand. They may originate from structured databases, unstructured text documents, time-series data, sensor readings, or even external sources such as APIs or web scraping. Examples of features include numerical values (e.g., age, temperature), categorical labels (e.g., product category, customer segment), text embeddings (e.g., word vectors), or engineered representations derived from raw data through feature engineering techniques.

The process of creating features (feature definition at block 110) often involves a combination of domain expertise, data exploration, and feature engineering. Domain experts work closely with data scientists to identify relevant features that are likely to capture meaningful patterns or relationships in the data. Feature engineering techniques may then be applied to transform or combine raw data into more informative representations that enhance the predictive power of ML models.

The process of creating features for a feature store can lead to feature definitions in various forms and languages (e.g., Python, SQL, Spark, etc.) due to the diverse nature of data sources, the complexity of ML tasks, and the preferences of different stakeholders involved in the feature engineering process.

Firstly, features may originate from disparate data sources, each with its own data format and structure. For example, features extracted from structured databases may be represented as SQL queries or database table schemas, while features derived from unstructured text data might be defined using natural language processing (NLP) techniques such as tokenization or word embeddings. Similarly, features obtained from time-series data may be expressed as temporal aggregations or window functions, requiring specialized syntax or domain-specific languages to define.

Furthermore, the complexity of ML tasks often necessitates the creation of features in diverse forms to capture the underlying patterns or relationships in the data effectively. For instance, features for image recognition tasks may be defined as pixel values or image descriptors, while features for natural language processing tasks may include word frequencies, syntactic structures, or semantic embeddings. Additionally, feature engineering techniques such as dimensionality reduction, feature crossing, or kernel transformations may result in features that are represented in mathematical or statistical forms, requiring specialized notations or expressions to describe.

Moreover, the feature engineering process typically involves collaboration among interdisciplinary teams comprising domain experts, data scientists, and ML engineers, each of whom may have different preferences or expertise in expressing feature definitions. Domain experts may provide input in domain-specific languages or terminologies, while data scientists may prefer to define features using statistical or mathematical formulations. ML engineers, on the other hand, may require features to be expressed in programming languages or frameworks compatible with ML model development and deployment.

To address this variance in features, a schema is defined to describe the structure and attributes of each feature. The schema specifies metadata such as the feature name, data type, format, and any constraints or validations associated with the feature. This schema serves as a blueprint for organizing and querying the features within the feature store.

Once the features are defined, they are optionally validated at block 115 prior to storage and use in a feature store to ensure the quality, accuracy, and reliability of the data used for training and evaluating machine learning models. The validation process can include schema validation, data quality checks, feature engineering validation, cross-validation and testing, and domain expert review.

Schema validation includes verifying that the features conform to a predefined schema or structure. The schema specifies the expected data types, formats, and constraints for each feature, ensuring consistency and interoperability across different datasets. Features that do not adhere to the schema may be flagged for further inspection or preprocessing before being stored in the feature store.

Data quality checks are performed to assess the completeness, accuracy, and consistency of the feature values. This may involve detecting missing values, outliers, or anomalies that could skew the analysis or undermine the reliability of the models. Techniques such as statistical analysis, outlier detection algorithms, or domain-specific rules may be employed to identify and address data quality issues.

Feature engineering validation involves validating the efficacy of feature engineering techniques applied during the preprocessing stage. This includes assessing the relevance, informativeness, and discriminative power of the engineered features in capturing meaningful patterns or relationships in the data. Validation techniques such as feature importance analysis, correlation analysis, or model-based evaluations may be used to evaluate the effectiveness of feature engineering transformations.

Cross-validation and testing procedures involve partitioning the data into training, validation, and test sets and evaluating the performance of the features across different subsets or folds. Cross-validation helps to assess the stability of feature representations and identify potential overfitting or data leakage issues that could compromise model performance.

Lastly, domain experts or subject matter specialists may review and validate features to ensure their relevance and interpretability in the context of the problem domain. Domain experts can provide valuable insights into the significance of specific features and help identify any domain-specific considerations or biases that need to be addressed.

Once defined and optionally validated, features are ingested into the feature store, where they are cataloged, organized, and made accessible to users via a distributed and scalable storage architecture 120 designed to accommodate large volumes of data and support high throughput and low latency access. Depending on the size and nature of the data, different storage solutions such as distributed file systems, key-value stores, or relational databases may be utilized. The storage architecture 120 is optimized for efficient data retrieval and manipulation, enabling fast access to features during model training and evaluation. The feature store thus serves as a centralized repository for managing the lifecycle of features, facilitating their discovery, reuse, and maintenance across ML and data science projects. By providing a standardized user interface 125 for accessing and manipulating features, the feature store streamlines the process of building and deploying ML models, ultimately driving efficiency and productivity in data-driven workflows.

The ingestion of the features into the feature store for accessibility includes applying a schema defined for the feature store to the features. The feature store schema is typically defined during the process of designing the feature store infrastructure, prior to the ingestion of any data. The schema design is developed to define the structure, data types, constraints, and metadata associated with each feature, providing a standardized framework for organizing and querying the feature data within the feature store. The metadata specifies information such as the feature name, data type (e.g., numerical, categorical, text), format, constraints, and any additional properties or annotations associated with the features. The schema design may also include considerations for versioning, lineage tracking, and metadata management.

Mores specifically, the feature store schema includes one or more of the following: a definition or schema for the features, the feature sets or groups, entity relationships, feature values, feature store metadata, feature store operations, and the like. For example, for the feature definition, each feature is defined with a unique identifier or name. The definition includes metadata such as data type (e.g., numerical, categorical, text), description, and any constraints or transformations applied to the feature. Example: FeatureID: age, DataType: numerical, Description: Customer's age in years, etc. For the feature set or group, each set or group is defined to provide a logical grouping of features that are typically used together for a specific task or model. Feature sets or groups may correspond to different data sources, entities, or use cases. Example: FeatureSet: customer_profile, Features: [age, gender, income]. For the entity relationships, each relationship between entities in the data is defined. Entities represent the objects or entities for which features are collected. For example, in e-commerce, entities could be customers, products, or orders. Example: Entity: customer, Features: [age, gender, income]. For feature values, each value is defined as the actual value of a feature for a specific entity, the entity ID, feature ID, timestamp, etc. Example: EntityID: 12345, FeatureID: age, Timestamp: 2022 Apr. 10, Value: 35. For the feature store metadata, additional metadata is provided to describe the feature store itself, such as versioning information, access controls, databases, schemas of the databases, and dependencies. Example: Version: 1.0, CreatedBy: JohnDoe, LastUpdated: 2002 Apr. 10. For feature store operations, operations are defined for managing the feature store, such as adding, updating, deleting features, querying feature values, and versioning. Example: AddFeature (feature_definition), GetFeature Value (entity_id, feature_id, timestamp). Overall, the feature store schema provides a structured way to organize and manage features, making it easier for data scientists and machine learning engineers to access, discover, and use features for model training and inference.

Applying the schema to the features involves mapping each individual feature to the defined structure and constraints outlined in the schema. This mapping process includes validating, normalizing, annotating with metadata, and organizing the features according to the predefined structure and constraints specified in the schema. As features are ingested into the feature store, each feature undergoes validation against the schema. This validation process checks whether the feature's attributes (such as data type, format, and constraints) align with what is specified in the schema. If the feature meets the criteria defined in the schema, it is accepted for storage in the feature store.

Otherwise, if the feature violates any schema constraints, it may be flagged as invalid and require corrective action. The schema dictates how features are normalized and transformed to adhere to standard formats and representations. For instance, if the schema specifies that categorical features should be one-hot encoded, numerical features should be scaled, or text features should be tokenized, these transformations are applied to the features during the ingestion process. By applying these transformations, the feature data is standardized and made consistent with the schema, ensuring uniformity across the feature store.

As features are stored in the feature store, metadata annotations specified in the schema are applied to provide additional context and descriptive information about each feature. This metadata includes attributes such as feature name, data type, description, source, version, and usage statistics. By associating metadata with the features, users can easily interpret and query the features stored in the feature store, enhancing data discoverability and usability. If indexing and partitioning strategies are defined in the schema, these strategies are applied to organize and optimize the storage of features within the feature store. Features may be indexed based on key attributes to enable fast lookup and retrieval operations. Additionally, features may be partitioned into smaller, manageable chunks based on predefined criteria such as time intervals or feature groups. These indexing and partitioning strategies help to improve query performance and scalability when accessing feature data from the feature store.

Figure 2A:
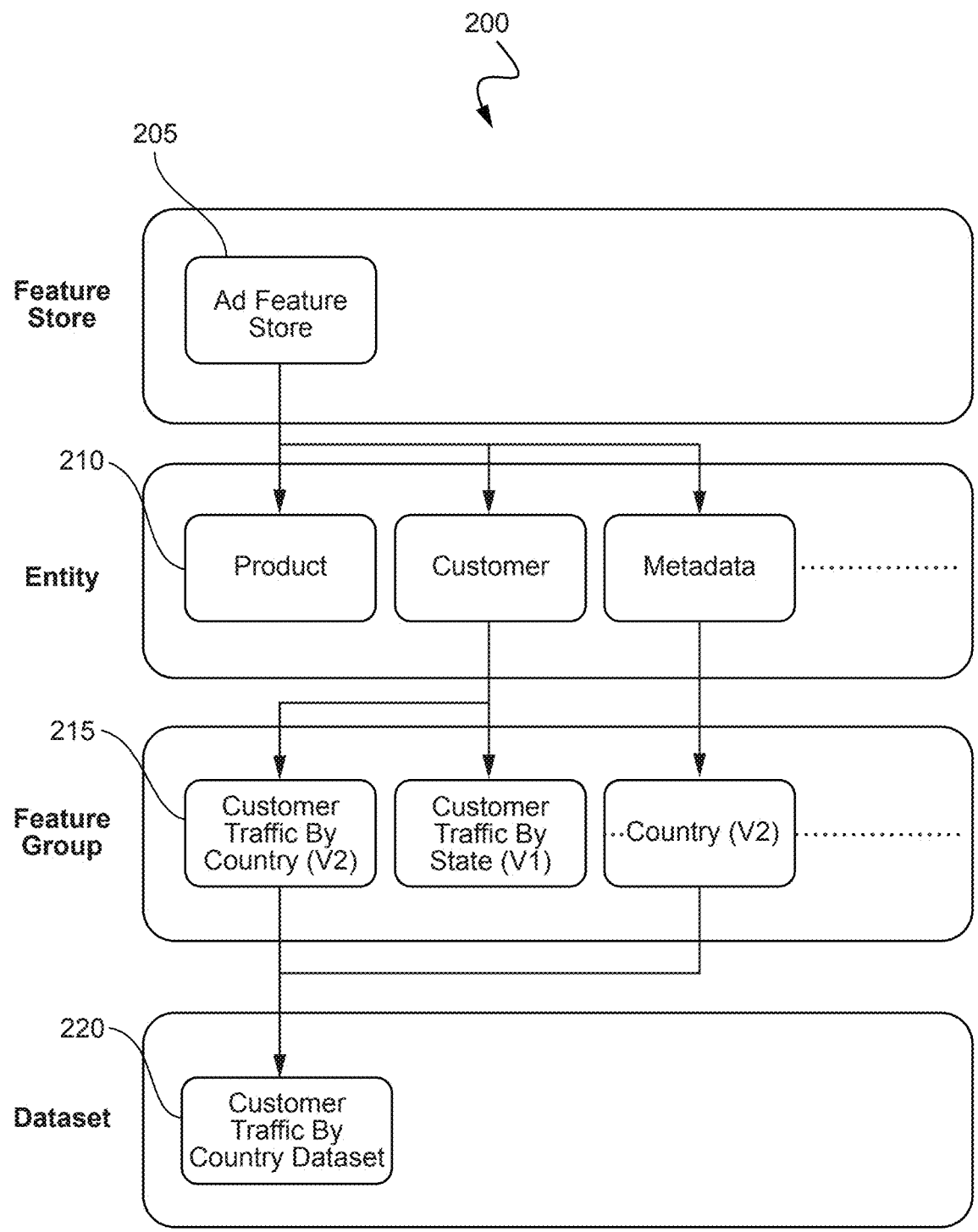
FIG. 2A shows a hierarchy of various objects of a feature store according to various embodiments.

FIG. 2A shows a hierarchy of various objects 200 of a feature store. The first level of the hierarchy includes the feature store itself 205 (as should be understood there could be multiple feature stores defined at this level).

The second level includes entities 210. The entities 210 are a group of semantically related features. An entity 210 is an object or concept that is described by its features. The first step by a user when accessing a feature store is typically to list the entities and the entities' associated features. Examples of entities are customer, product, transaction, review, image, and document.

The third level includes feature groups 215. A feature group 215 is a collection of related features that are often used together in machine learning models. Feature groups serve as an organizational unit in the feature store to manage, version, and share features across different machine learning projects. By organizing features into groups, data scientists and machine learning engineers can efficiently discover, reuse, and collaborate on features. Feature groups reduce the redundant work and ensure consistency in feature engineering. In a feature group, three key types play important roles and include primary keys, partition keys, and event timestamp keys. Primary keys uniquely identify individual records in the feature group. They ensure the uniqueness and integrity of each entry, allowing for efficient retrieval and modification of specific data points. Partition keys assist in distributing and organizing data across different partitions in the feature group. They enable efficient data retrieval by logically grouping related information, optimizing query performance, and minimizing resource utilization. Event timestamp keys capture the temporal aspect of the data by indicating the time or timestamp associated with a specific event or entry in the feature group. They facilitate time-based querying, trend analysis, and time-series operations.

Figure 2B:
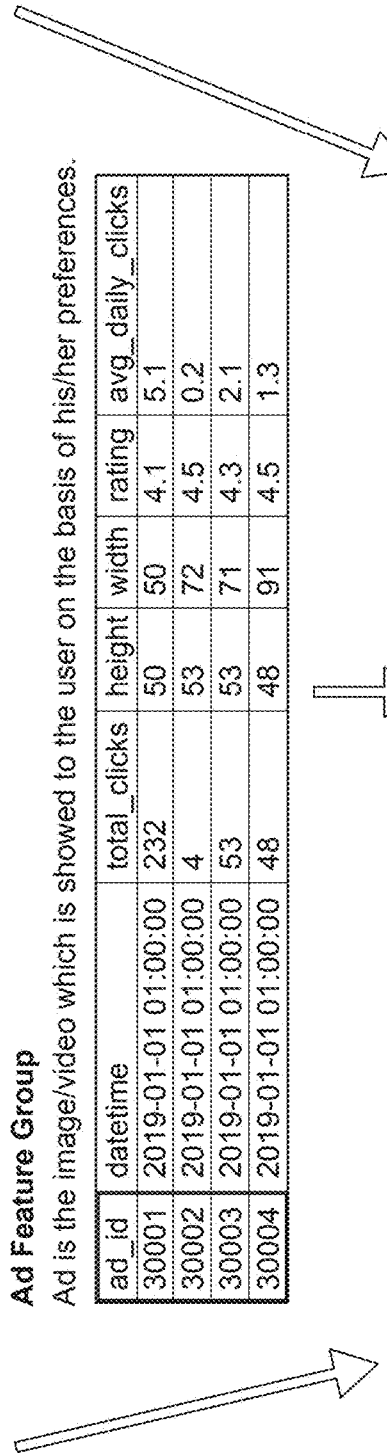
FIG. 2B shows the features that make up a dataset are collected from one or more feature groups according to various embodiments.

The fourth level includes datasets 220. A dataset 220 is a collection of features that are used together to train a model or perform model inference. As shown in FIG. 2B, the features that make up a dataset 220 are collected from one or more feature groups 215.

With reference back to FIG. 1, during the ingestion or preprocessing stage (defining and validating), one or more transformations may be applied to the features via transformation constructs. Transformations are the process of modifying or converting raw data features into a more suitable format or representation that is better suited for analysis, modeling, or consumption by machine learning algorithms. Transformations are important for improving the quality, relevance, and usefulness of features which in turn can enhance the performance of ML models. Transformations can be applied using various techniques (e.g., Pandas Transformation lets users to do the transformation using native pandas functionality and Spark Transformation lets users to do the transformation using native spark functionality) and the transformations serve several purposes, including data normalization, encoding, feature engineering, and improving the quality and usefulness of the feature data.

Normalization is a transformation technique that scales numeric features to a standard range or distribution, typically between 0 and 1 or −1 and 1. This ensures that features with different scales or units contribute equally to the analysis and modeling process, preventing biases and improving the performance of machine learning algorithms. Common normalization techniques include min-max scaling, z-score normalization, and robust scaling.

Encoding is used to convert categorical features, which represent discrete categories or labels, into numerical or binary representations that can be processed by machine learning algorithms. One-hot encoding is a popular technique where each category is represented as a binary vector, with a 1 indicating the presence of the category and 0s for all other categories. Other encoding techniques include label encoding, ordinal encoding, and target encoding.

Feature engineering involves creating new features or transforming existing features to extract more meaningful or informative representations of the data. This may include mathematical transformations, such as logarithmic or polynomial transformations, to capture nonlinear relationships in the data. Feature engineering can also involve aggregating, grouping, or summarizing existing features to create higher-level features that capture important patterns or trends in the data.

If the feature data includes text or unstructured data, text processing transformations may be applied to preprocess and extract useful information from the text. This may involve tokenization, where text is split into individual words or tokens, as well as techniques such as stemming, lemmatization, and stop-word removal to clean and normalize the text data. Text may also be converted into numerical representations using methods like word embeddings or TF-IDF (Term Frequency-Inverse Document Frequency).

In instances where the feature data has a high dimensionality or contains redundant or irrelevant features, dimensionality reduction techniques may be applied to reduce the number of features while preserving the most important information. Principal Component Analysis (PCA), t-distributed Stochastic Neighbor Embedding (t-SNE), and Singular Value Decomposition (SVD) are common dimensionality reduction techniques used to compress feature space while retaining as much variance as possible.

The user interface 125 allows for feature discovery by using various plug-ins and tools such as Jupytr contributed notebook extensions. The user interface 125 helps users to identify which features belong to specific datasets and feature groups and establish the process of exploring available features in a particular dataset or feature group. For example, feature groups are instrumental in feature discovery as they offer a structured way to organize and manage features based on their semantic meaning or context. By grouping related features together, data scientists can efficiently locate and use the relevant attributes for model development. The versioning capability of feature groups ensures that changes in feature definitions are tracked. Tracking enables reproducibility and aids in evaluating the impact of feature modifications on model performance. The collaborative aspect of feature groups fosters knowledge sharing and reuse across data driven projects, which promotes efficiency and consistency in the feature discovery processes. Datasets also support iterative experimentation, letting data scientists create various dataset configurations with different feature combinations and transformations, which facilites the discovery of the most valuable features for model training.

The user interface 125 also helps users to perform lineage tracking, statistical analysis. and transformations. Lineage tracking provides a historical record of data transformations and processing, which ensures transparency and reproducibility in feature engineering and model development. Statistical analysis of features helps uncover insights about their distributions, central tendencies, and variations, which aids in feature selection and understanding data characteristics. As described above, transformation constructs are an important component of feature engineering, and enable data scientists to adapt and enhance features to improve model performance. The flexibility to perform mathematical operations, scaling, normalization, handling missing data, and encoding categorical variables, transformation constructs empowers data professionals to craft features that align with specific modeling requirements.

III. Feature Discovery Using Natural Language

Figures 3, 4A:
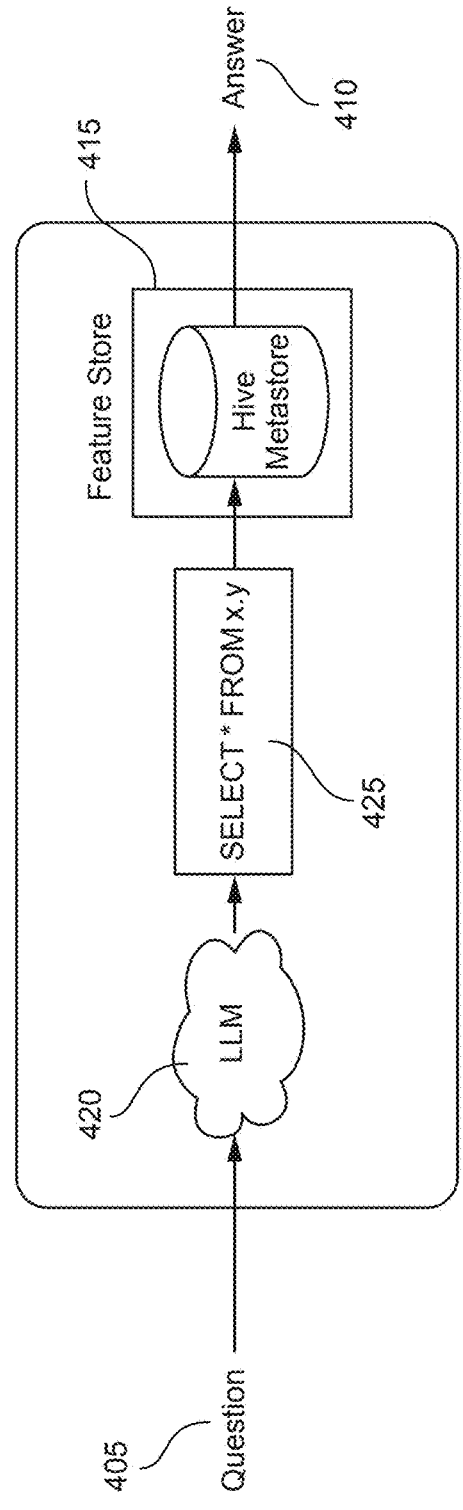
FIG. 3 illustrates the complexity of a programming language query according to various embodiments.
FIG. 4A is a simplified block diagram of a feature discovery system for translating natural language queries into programming language queries (e.g., SQL) and executing the system language queries on a feature store to acquire search results for the natural language queries according to various embodiments.

Despite the benefits that the various plug-ins and tools provide for feature discovery, accessing and querying data within feature stores can present significant challenges, particularly for users with limited technical proficiency. For example, users typically must write very complex queries such as the SQL query to obtain fairly basic answers from the feature store. FIG. 3 illustrates this complexity—in Pandas if a user wants to apply a join function 305 on feature groups and a feature has the same name on both feature groups, the user can use the on=[ ] parameter; however, if the feature has different names on the feature groups, then the user can use the left_on=[ ] and right_on-[ ] parameters. Thus, requiring the user to have some technical proficiency in the type of underlying data set, e.g., Python libraries and/or programming language, e.g., SQL.

To address this challenge and others, techniques described herein were developed to allow for a user to provide natural language prompts for querying data stored in feature stores. FIG. 4A is a simplified block diagram of a feature discovery system 400 for translating natural language queries into programming language queries (e.g., SQL) and executing the system language queries on a feature store to acquire search results for the natural language queries according to various embodiments. Initially, a natural language query 405 is received from a user for retrieving features 410 from a feature store 415. An input prompt for the machine learning model 420 (e.g., in this instance a large language model (LLM)) is then generated by appending certain text (see, e.g., script in FIG. 4B) to the natural language query 405. The appended text informs the LLM how to infer the data in the text and retrieve information describing the feature store 415. An input prompt for an LLM 420 serves as instructions or cues for the model to generate text in a specific way (e.g., in this instance as a programming language). The input prompt comprises: (i) context: This provides the initial information or situation that the model should consider when generating a response. It can be a few sentences or a statements outlining information concerning the feature store 415 as described in further detail herein; (ii) task: Is a statement concerning what the user wants the model to do with the provided context. In this instance, the natural language query 405 from the user can be the task. This can be a discovery query from the user to retrieve features from the features store, a query to manipulate features from the feature store, a query to identify one or more feature groups or data sets, or the like. Optionally (iii) constraints: Are specific requirements or limitations for the generated text. In this instance, a constraint can be a particular programming language to be used as output and/or particular variables, functions, syntax, conditionals, control structure, or the like for the programming language.

The feature store 415 stores the information describing the feature store 415 as part of the feature store schema, e.g., { }.{feature_group_name}, and the function of a generator module (i.e., custom algorithmic addition to a LLM model) is to check various database schemas and determine the features the user has referenced in the natural language query 405 in order to generate a query 425 in a specific programming language. This process follows a pattern of zero-shot learning where details concerning the feature store 415 are fetched on the go and specified information is provided to the LLM 420 to generate the query 425 without any prior training needs, and thus the feature discovery system 400 is capable of catering specifically to the unique data structure and query requirements within a feature store environment. Zero-shot learning is a machine learning paradigm where a model such as the LLM 410 is trained for a particular task such as classification or text generation concerning objects, information, or concepts for which the model has never seen during training. In traditional supervised learning, models are trained on a labeled dataset with examples of each class or text they need to recognize. However, in zero-shot learning, the model is expected to generalize to unseen classes or text based on the knowledge it has acquired during training (as described in further detail herein). For example, it would be impractical or expensive to train a LLM on examples for text generation on every possible query or request in every possible programming language for every possible feature store, and thus using zero-shot learning the model is expected to generalize to unseen queries or requests, programming languages, and/or feature stores. This generalization is assisted by the function of the generator module and acquisition of information describing the feature store 415.

Figures 4B, 5A:
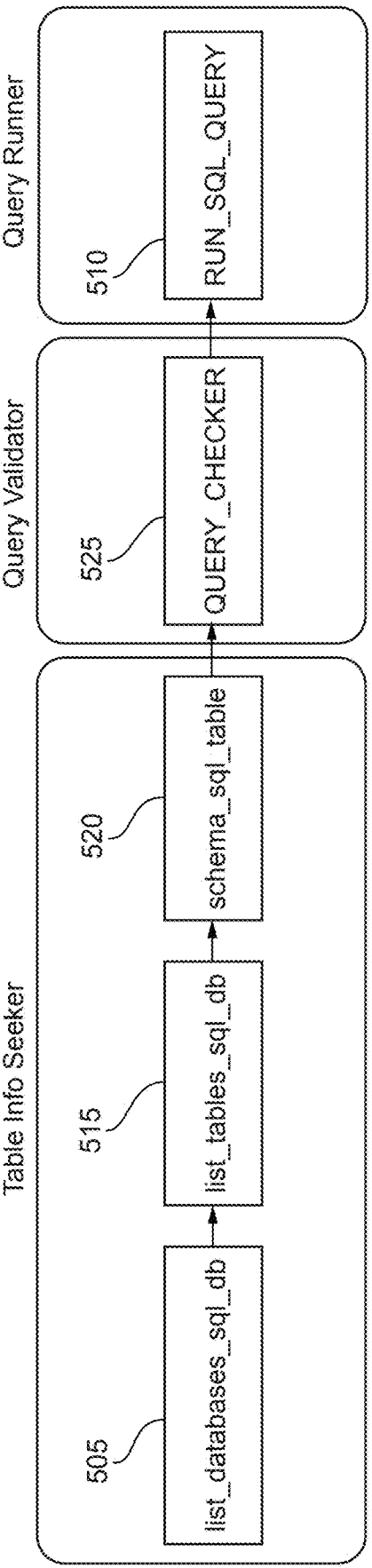
FIG. 4B shows an example of a script that is generated by the feature discovery system according to various embodiments.
FIG. 5A is a simplified block diagram of orchestration by the generator module according to various embodiments.

The information describing the feature store 415 is acquired using the generator module, which is implemented as part of the LLM 410 (this allows for the LLM to call the feature store and acquire the information describing the feature store). The generator module, to be used with the LLM, is customized and predefined for each feature store as part of the software development kit for the feature store. More specifically, as shown in FIG. 4B, a script is generated by the feature discovery system 400 that comprises: identification of a machine learning model (e.g., LLM 410), identification of the feature store (e.g., feature store 415) to run the query 405 on, and identification of a generator module 430 to orchestrate extraction of the information about the feature store. This script generation and execution thereafter is provided as a function that is also part of the software development kit for the feature store. The script is appended to the natural language prompt and fed to the generator/LLM. This approach utilizes advanced prompting techniques to guide the underlying LLM towards behaving like a feature store query language (e.g., SQL) generator.

The orchestration by the generator module 430 is illustrated in FIG. 5A and can be executed by the LLM as an algorithm or series of functional steps. The algorithm or series of functional steps includes the LLM at block 505 executing a first function that generates and executes, via query runner function 510, one or more database queries (e.g., SQL queries) on one or more databases (e.g., Spark SQL databases) for retrieval of a list of databases available within the feature store (see, e.g., FIG. 5B, which includes thoughts by the LLM as it progresses through this data gathering stage). The first function also gathers information about the databases, including details such as the databases' structure, metadata, schemas, and other relevant information. Thereafter, the LLM at block 515 executes a second function that generates and executes, via query runner function 510, one or more table queries on the one or more databases (e.g., Spark SQL databases) for retrieval of a list of tables available within the one or more databases (see, e.g., FIG. 5C, which includes thoughts by the LLM as it progresses through this data gathering stage). The tables represent feature groups and/or datasets available within the one or more databases.

Thereafter, the LLM at block 520 executes a third function that generates and executes, via query runner function 510, one or more table queries on the tables for retrieval of information about the tables, including details such as the tables' metadata, schemas, and other relevant information (see, e.g., FIGS. 5D and 5E, which includes thoughts by the LLM as it progresses through this data gathering stage). The third function can also retrieve a list of features within each feature group that are accessible within the feature store environment. At these various steps (505, 515, and 520), the generator module 430 via query checker function 525 examines the queries to be executed within the feature store environment and ensures that the queries are correct in terms of syntax and performance, validating their accuracy for proper execution by query runner function 510. Consequently, this approach integrates seamlessly with the feature store's built-in tools and schema information. This allows the LLM to access and utilize the feature store's inherent capabilities, such as data type identification, entity recognition, and relationship analysis, to ensure the generated queries are optimized for performance and accuracy.

With respect back to FIG. 4, once the LLM via the generator module 430 has gathered all of the information it needs to translate the natural language query 405 it translates the natural language query 405 into a query 425 in a specific programming language. Translating natural language into a programming language using a LLM such as a GPT involves several steps that leverage deep learning techniques, specifically those in natural language processing (NLP). The input prompt is first broken down into smaller units called tokens. The tokens can be words or subwords. Each token is then converted into a numerical form known as an embedding. These embeddings capture semantic and syntactic meanings of the tokens. LLMs, particularly those based on the transformer architecture such as a Generative Pre-trained Transformer, use layers of self-attention mechanisms. These layers enable the LLM to weigh the importance of different words in a sentence based on the embeddings, irrespective of their position. Through these layers, the LLM understands the context of each word, the feature store, and the overall sentence or paragraph, which is important for accurate translation into the programming language. The LLM is associated with understanding the context based on the metadata and the schemas for the databases, the metadata and schema for the tables, and the one or more feature groups determined by the generator module 430. By training the LLM on vast amounts of text, including examples of both natural and programming languages, the LLM learns patterns and mappings between these languages. When translating, the LLM generates programming language code token by token. It predicts the most likely next token based on the previous tokens and the learned patterns. The output tokens are then synthesized into coherent code in the target programming language. Optionally, further steps might be involved to refine the code, such as syntax error checks or optimizing the code structure based on the programming language's best practices or one or more constraints provided within the prompt. Advantageously, this allows the LLM to leverage its natural language understanding capabilities to translate user intent into accurate and efficient queries, even for complex information requests.

Once the natural language query 405 is translated into the programming language query 425, the feature discovery system 400 executes the programming language query 425 on the feature store 415 to retrieve the features 410 relevant to the natural language query 405. Features are retrieved based on specified entity IDs and time range, and optionally filtered by selected feature and/or data group(s) or set(s). Depending on the use case, missing feature values may be imputed, interpolated, or treated as special cases during downstream processing. The retrieved feature values may be returned as structured data (e.g., a table or dictionary) for further processing. For example, once the relevant features have been retrieved and processed, they can be used as input for machine learning models (training or inference), analytics, or other downstream applications. For example, the features may be used individually or combined with other data sources and fed into model training pipelines or inference systems to make predictions or generate insights (see, e.g., FIG. 6).

IV. Machine Learning Techniques

Figure 6:
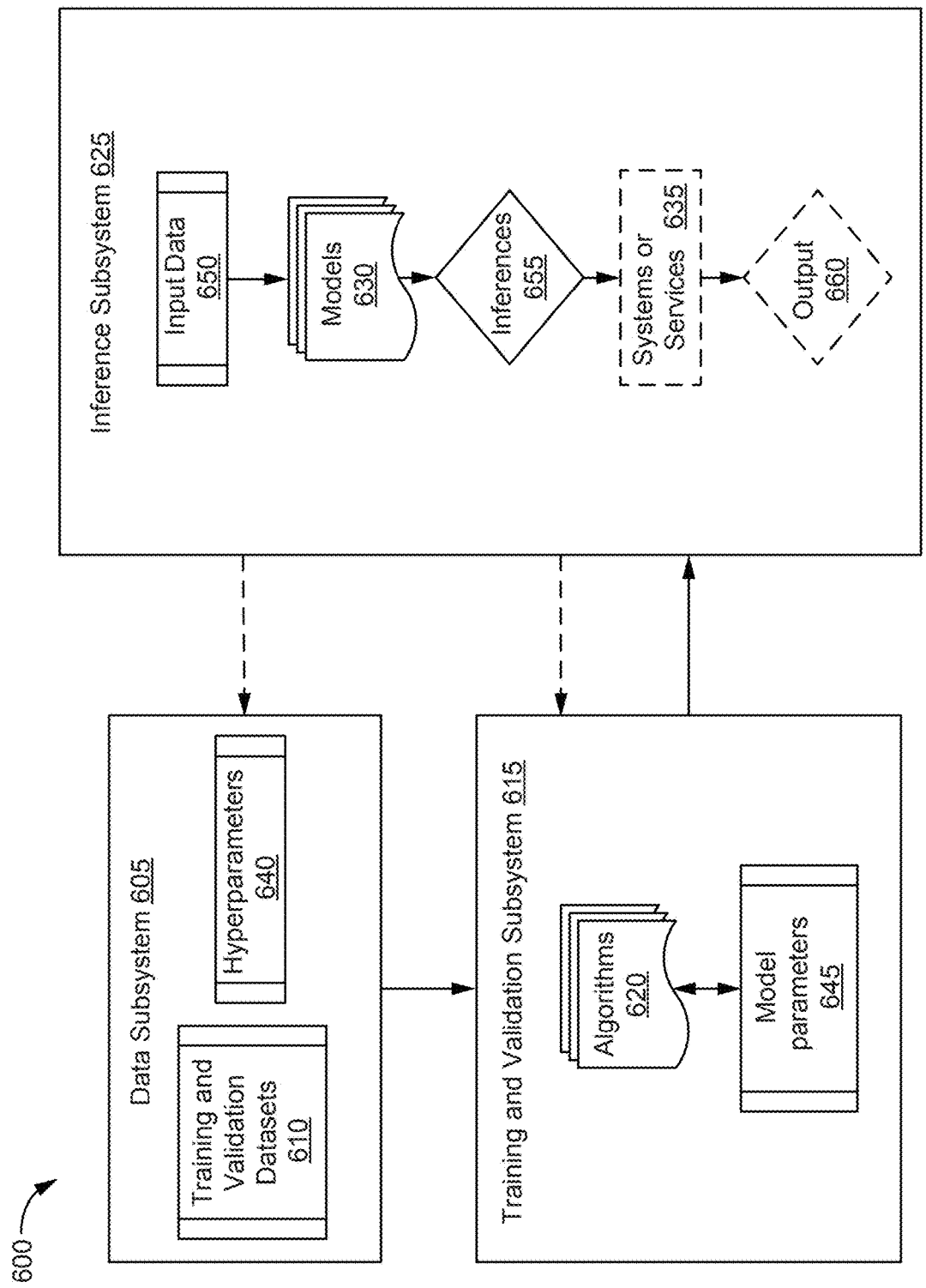
FIG. 6 shows a block diagram of a machine learning pipeline comprising several subsystems that work together to train, validate, and implement one or more machine learning models according to various embodiments.

FIG. 6 shows a block diagram of a machine learning pipeline 600 comprising several subsystems that work together to train, validate, and implement one or more machine learning models in accordance with various embodiments. Machine learning pipeline 600 may be executed as part of or in addition to the feature discovery system 400 described with respect to FIG. 4A. The machine learning pipeline 600 comprises a data subsystem 605 for collecting, generating, preprocessing, and labeling of training and validation datasets 610, training and validation subsystem 615 that facilitates the training and validation of one or more machine learning algorithms 620, and inference subsystem 625 for deploying and implementing one or more trained machine learning models 630 independently or in combination with one or more other systems or services 635 for downstream processes.

As used herein, machine learning algorithms (also described herein as simply algorithm or algorithms) are procedures that are run on datasets (e.g., training and validation datasets) and perform pattern recognition on datasets, learn from the datasets, and/or are fit on the datasets. Examples of machine learning algorithms include linear and logistic regression, decision trees, artificial neural networks, k-means, and k-nearest neighbor. In contrast, machine learning models (also described herein as simply model or models) are the output of the machine learning algorithms and are comprised of model data and a prediction algorithm. In other words, the machine learning model is the program that is saved after running a machine learning algorithm on training data and represents the rules, numbers, and any other algorithm-specific data structures required to make inferences. For example, a linear regression algorithm may result in a model comprised of a vector of coefficients with specific values, a decision tree algorithm may result in a model comprised of a tree of if-then statements with specific values, or neural network, backpropagation, and gradient descent algorithms together result in a model comprised of a graph structure with vectors or matrices of weights with specific values.

Data

Data subsystem 605 is used to collect, generate, preprocess, and label data to be used to train and validate one or more machine learning algorithms 620. The data collection can include exploring various data sources such as public datasets, private data collections, or real-time data streams, depending on a project's needs. In some instances, a data source is a public or online repository of information or examples pertinent to a general or target domain space. Many domains have publicly available datasets provided by governments, universities, or organizations. For example, many government and private entities offer datasets on healthcare, environmental data, and more through various portals. For proprietary needs, data might be available through partnerships or purchases from private companies that specialize in data aggregation. In certain instances, a data source is a features store and the training and validation datasets 610 include features discovered using the techniques described herein with respect to FIGS. 1-5E. Once a data source is identified, data subsystem 605 can be used to collect data through appropriate methods such as downloading from online repositories, web scraping, using APIs for real-time data, creating datasets through surveys and experiments, or by deploying sensors in the environment.

Data synthesis and/or data augmentation techniques may be implemented using data subsystem 605 to generate data to be used for the training and validation datasets 610 (e.g., when data is insufficient from public datasets and/or private data collections). Data synthesizing involves creating entirely new data points from scratch. This technique may be used when real data is insufficient, too sensitive to use, or when the cost and logistical barriers to obtaining more real data are too high. The synthesized data should be realistic enough to effectively train a machine learning model, but distinct enough to comply with regulations (e.g., copyright and data privacy), if necessary. Techniques such as Generative Adversarial Networks (GANs) or Variational Autoencoders (VAEs) may be used to generate new data examples. These models learn the distribution of real data and attempt to produce new data examples that are statistically similar but not identical. Data augmentation, on the other hand, refers to techniques used to artificially expand the size of a dataset by creating modified versions of existing data examples. The primary goal of data augmentation is to increase variation in the data in order to make the model more robust to variations it might encounter in the real world, thereby improving its ability to generalize from the training data to unseen data. This is especially common in image and speech recognition tasks but is applicable to other data types as well. For images, data augmentation may include rotations, flipping, scaling, or altering the lighting conditions. For text, data augmentation may include synonyms replacement, back translation, or sentence shuffling. For audio, data augmentation may include changes made to pitch, speed, or background noise.

Preprocessing may be implemented using data subsystem 605 in the data collection process, serving as a bridge between raw data acquisition and effective model training. The primary objective of preprocessing is to transform raw data into a format that is more suitable and efficient for analysis, ensuring that the data fed into machine learning algorithms is clean, consistent, and relevant. This step can be useful because raw data often comes with a variety of issues such as missing values, noise, irrelevant information, and inconsistencies that can significantly hinder the performance of a model. By standardizing and cleaning the data beforehand, preprocessing helps in enhancing the accuracy and efficiency of the subsequent analysis, making the data more representative of the underlying problem the model aims to solve.

Several example techniques implemented in preprocessing include data cleaning, normalization, feature extraction, and dimensionality reduction. Data cleaning may involve removing duplicates, filling in missing values, or filtering out outliers to improve data quality. Normalization, involves scaling numeric values to a common scale without distorting differences in the ranges of values, which helps prevent biases in the model due to the inherent scale of features. Feature extraction involves transforming the input data into a set of useable features, possibly reducing the dimensionality of the data in the process. For instance, in text analysis, raw text data might be converted into a bag-of-words model or into TF-IDF scores to capture the relevance of words in documents. Dimensionality reduction techniques like Principal Component Analysis (PCA) or Autoencoders may be used to reduce the number of random variables under consideration, by obtaining a set of principal variables. These techniques not only help in reducing the computational load on the model but also in mitigating issues like overfitting by simplifying the data without losing critical information.

In the instance that machine learning pipeline 600 is used for supervised or semi-supervised learning of machine learning models, labeling techniques can be implemented as part of the data collection. The quality and accuracy of data labeling directly influence the model's performance, as labels serve as the definitive guide that the model uses to learn the relationships between the input features and the desired output. Particularly in complex domains such as image recognition, natural language processing, or medical diagnosis, precise and consistent labeling is important because it provides the ground truth or target outcomes against which the model's predictions are compared and adjusted during training. Effective labeling ensures that the model is trained on correct and clear examples, thus enhancing its ability to generalize from the training data to real-world scenarios.

Labeling techniques can vary significantly depending on the type of data and the specific requirements of the project. Manual labeling, where human annotators label the data, is one method that can be used. This approach may be useful when a detailed understanding and judgment are required, such as in labeling medical images or categorizing text data where context and subtlety are important. However, manual labeling can be time-consuming and prone to inconsistency, especially with a large number of annotators. To mitigate this, semi-automated labeling tools may be used as part of data subsystem 605 to pre-label data using algorithms, which human annotators may then review and correct as needed. Another approach is active learning, a technique where the model being developed is used to label new data iteratively. The model suggests labels for new data points, and human annotators may review and adjust certain predictions such as the most uncertain predictions. This technique optimizes the labeling effort by focusing human resources on a subset of the data, e.g., the most ambiguous cases, improving efficiency and label quality through continuous refinement.

Once collected, generated, preprocessed, and/or labeled, the data may then be split into the training and validation datasets 610. The data collected is typically split into at least three subsets: training, validation, and testing. The training set is used to fit the model, where the machine learning model learns to make inferences based on the training data. The validation set, on the other hand, is utilized to tune hyperparameters and prevent overfitting by providing a sandbox for model selection. Finally, the test set serves as a new and unseen dataset for the model, used to simulate real-world application and evaluate the final model's performance. The process of splitting ensures that the model can perform well not just on the data it was trained on, but also on new, unseen data, thereby validating and testing its ability to generalize.

Various techniques can be employed to split the data effectively, with each method aiming to maintain a good representation of the overall dataset in each subset. A simple random split (e.g., a 70/20/10%, 80/10/10%, or 60/25/15%) is the most straightforward approach, where examples from the data are randomly assigned to each of the three sets. However, more sophisticated methods may be necessary to preserve the underlying distribution of data. For instance, stratified sampling may be used to ensure that each split reflects the overall distribution of a specific variable, particularly useful in cases where certain categories or outcomes are underrepresented. Another technique, k-fold cross-validation, involves rotating the validation set across different subsets of the data, maximizing the use of available data for training while still holding out portions for validation. These methods help in achieving more robust and reliable model evaluation and are useful in the development of predictive models that perform consistently across varied datasets.

Data subsystem 605 is also used to set and implement hyperparameters 640 to be optimized by the training and validation subsystem 615. The hyperparameters control the overall behavior of the models. Unlike model parameters 645 that are learned automatically during training, hyperparameters 640 are set before training begins and have a significant impact on the performance of the model. For example, in a neural network, hyperparameters include the learning rate, number of layers, number of neurons per layer, and activation functions, among others. These settings can determine how quickly a model learns, its capacity to generalize from training data to unseen data, and its overall complexity. Correctly setting hyperparameters is important because inappropriate values can lead to models that underfit or overfit the data. Underfitting occurs when a model is too simple to learn the underlying pattern of the data, and overfitting happens when a model is too complex, learning the noise in the training data as if it were signal.

Training, Validating, and Testing

The training and validation subsystem 615 is comprised of a combination of specialized hardware and software to efficiently handle the computational demands required for training, validating, and testing a machine learning model. On the hardware side, high-performance GPUs (Graphics Processing Units) may be used for their ability to perform parallel processing, drastically speeding up the training of complex models, especially deep learning networks. CPUs (Central Processing Units), while generally slower for this task, may also be used for less complex model training or when parallel processing is less critical. TPUs (Tensor Processing Units), designed specifically for tensor calculations, provide another level of optimization for machine learning tasks. On the software side, a variety of frameworks and libraries are utilized, including TensorFlow, PyTorch, Keras, and scikit-learn. These tools offer comprehensive libraries and functions that facilitate the design, training, validation, and testing of a wide range of machine learning models across different computing platforms, whether local machines, cloud-based systems, or hybrid setups, enabling developers to focus more on model architecture and less on underlying computational details.

Training is the initial phase of developing machine learning models 630 where the model learns to make predictions or decisions based on data training data provided from the training and validation datasets 610. During this phase, the model iteratively adjusts its internal model parameters 645 to minimize the difference between its predictions and the actual outcomes in the training data. This process, known as fitting, is fundamental because it directly influences the accuracy and effectiveness of the model. The training phase is driven by three primary components: the model architecture (which defines the structure of the algorithm(s) 620), the training data (which provides the examples from which to learn), and the learning algorithm (which dictates how the model adjusts its model parameters). The goal is for the model to capture the underlying patterns of the data without memorizing specific examples, thus enabling it to perform well on new, unseen data.

The model architecture is the specific arrangement and structure of the various components and layers that make up a model. This includes the configuration of layers in a neural network, such as the number of layers, the type of layers (e.g., convolutional, recurrent, fully connected), the number of neurons in each layer, and the connections between these layers. Model architecture also encompasses the choice and arrangement of features and algorithms used in various models, such as decision trees or linear regression. The architecture determines how input data is processed and transformed through various computational steps to produce the output. The model architecture directly influences the model's ability to learn from the data effectively and efficiently, and it impacts how well the model performs tasks such as classification, regression, or prediction, adapting to the specific complexities and nuances of the data it is designed to handle.

The model architecture can encompass a wide range of algorithms 620, each suitable for different kinds of tasks and data types. Examples of algorithms 620 include, without limitation, linear regression, logistic regression, decision tree, Support Vector Machines, Naives Bayes algorithm, K-Nearest Neighbors, K-Means, Random forest, dimensionality reduction algorithms, AdaBoosting algorithm, Gradient Boosting Machines, and Artificial Neural Networks such as convolutional neural network ("CNN"), an inception neural network, a U-Net, a V-Net, a residual neural network ("Resnet"), a transform neural network, a recurrent neural network, or other variants of Deep Neural Networks ("DNN") (e.g., a multi-label n-binary DNN classifier or multi-class DNN classifier). These algorithms can be implemented using various machine learning libraries and frameworks such as TensorFlow, PyTorch, Keras, and scikit-learn, which provide extensive tools and features to facilitate model building, training, validation, and testing.

The learning algorithm is the overall method or procedure used to adjust the model parameters 645 to fit the data. It dictates how the model learns from the data provided during training. This includes the steps or rules that the algorithm follows to process input data and make adjustments to the model's internal parameters (e.g., weights in neural networks) based on the output of the objective function. Examples of learning algorithms include gradient descent, backpropagation for neural networks, and splitting criteria in decision trees.

Various techniques may be employed by training and validation subsystem 615 to train machine learning models 630 using the learning algorithm, depending on the type of model and the specific task. For supervised learning models, where the training data includes both inputs and expected outputs (e.g., ground truth labels), gradient descent is a possible method. This technique iteratively adjusts the model parameters 645 to minimize or maximize an objective function (e.g., a loss function, a cost function, a contrastive loss function, etc.). The objective function is a method to measure how well the model's predictions match the actual labels or outcomes in the training data. It quantifies the error between predicted values and true values and presents this error as a single real number. The goal of training is to minimize this error, indicating that the model's predictions are, on average, close to the true data. Common examples of loss functions include mean squared error for regression tasks and cross-entropy loss for classification tasks.

The adjustment of the model parameters 645 is performed by the optimization function or algorithm, which refers to the specific method used to minimize (or maximize) the objective function. The optimization function is the engine behind the learning algorithm, guiding how the model parameters 645 are adjusted during training. It determines the strategy to use when searching for the best weights that minimize (or maximize) the objective function. Gradient descent is a primary example of an optimization algorithm, including its variants like stochastic gradient descent (SGD), mini-batch gradient descent, and advanced versions like Adam or RMSprop, which provide different ways to adjust learning rates or take advantage of the momentum of changes. For example, in training a neural network, backpropagation may be used with gradient descent to update the weights of the network based on the error rate obtained in the previous epoch (cycle through the full training dataset). Another technique in supervised learning is the use of decision trees, where a tree-like model of decisions is built by splitting the training dataset into subsets based on an attribute value test. This process is repeated on each derived subset in a recursive manner called recursive partitioning.

In unsupervised learning, where training data does not include labels, different techniques are used. Clustering is one method where data is grouped into clusters that maximize the similarities of data within the same cluster and maximize the differences with data in other clusters. The K-Means algorithm, for example, assigns each data point to the nearest cluster by minimizing the sum of distances between data points and their respective cluster centroids. Another technique, Principal Component Analysis (PCA), involves reducing the dimensionality of data by transforming it into a new set of variables, the principal components, which are uncorrelated and ordered so that the first few retain most of the variation present in all of the original variables. These techniques help uncover hidden structures or patterns in the data, which can be essential for feature reduction, anomaly detection, or preparing data for further supervised learning tasks.

Validating is another phase of developing machine learning models 630 where the model is checked for deficiencies in performance and the hyperparameters 640 are optimized based on validation data provided from the training and validation datasets 610. The validation data helps to evaluate the model's performance, such as accuracy, precision, recall, or F1-score, to gauge how well the model is likely to perform in real-world scenarios. Hyperparameter optimization, on the other hand, involves adjusting the settings that govern the model's learning process (e.g., learning rate, number of layers, size of the layers in neural networks) to find the combination that yields the best performance on the validation data. One optimization technique is grid search, where a set of predefined hyperparameter values are systematically evaluated. The model is trained with each combination of these values, and the combination that produces the best performance on the validation set is chosen. Although thorough, grid search can be computationally expensive and impractical when the hyperparameter space is large. A more efficient alternative optimization technique is random search, which samples hyperparameter combinations from a defined distribution randomly. This approach can in some instances find a good combination of hyperparameter values faster than grid search. Advanced methods like Bayesian optimization, genetic algorithms, and gradient-based optimization may also used to find optimal hyperparameters more effectively. These techniques model the hyperparameter space and use statistical methods to intelligently explore the space, seeking hyperparameters that yield improvements in model performance.

Once a machine learning model has been trained and validated, it undergoes a final evaluation using test data provided from the training and validation datasets 610, which is a separate subset of the data that has not been used during the training or validation phases. This step is crucial as it provides an unbiased assessment of the model's performance in simulating real-world operation. The test dataset serves as new, unseen data for the model, mimicking how the model would perform when deployed in actual use. During testing, the model's predictions are compared against the true values in the test dataset using various performance metrics such as accuracy, precision, recall, and mean squared error, depending on the nature of the problem (classification or regression). This process helps to verify the generalizability of the model-its ability to perform well across different data samples and environments-highlighting potential issues like overfitting or underfitting and ensuring that the model is robust and reliable for practical applications. The machine learning models 630 are fully validated and tested once the output predictions have been deemed acceptable by user defined acceptance parameters. Acceptance parameters may be determined using correlation techniques such as Bland-Altman method and the Spearman's rank correlation coefficients and calculating performance metrics such as the error, accuracy, precision, recall, receiver operating characteristic curve (ROC), etc.

Inference Phase for Machine Learning Models

The inference subsystem 625 is comprised of various components for deploying the machine learning models 630 in a production environment. Deploying the machine learning models 630 includes moving the models from a development environment (e.g., the training and validation subsystem 615, where it has been trained, validated, and tested, into a production environment where it can make inferences on real-world data (e.g., input data 650). This step typically starts with the model being saved after training, including its parameters and configuration such as final architecture and hyperparameters. It is then converted, if necessary, into a format that is suitable for deployment, depending on the deployment environment. For instance, a model trained in a scientific computing environment such as Python might be converted into a Java-friendly format for integration into a larger enterprise application. Deployment can be conducted on various platforms, including on-premises servers, cloud environments like AWS, Azure, Google, Applicants Oracle Cloud (OCI), or even edge devices like smartphones or IoT devices, depending on the application's needs and the expected volume of inference requests.

Once deployed, the model is ready to receive input data 650 and return outputs (inferences 655). In some instances, the model resides as a component of a larger system or service 635 (e.g., an application). In some instances, the machine learning model is a LLM trained to translate natural language queries into programming language and this larger system is the feature discovery system 400 described with respect to FIG. 4A. In other instances, the machine learning model is a model to be trained or implemented with features discovered from a feature store and this larger system is the feature discovery system 400 described with respect to FIG. 4A. This setup may involve an API (Application Programming Interface) that facilitates communication between the model and the application. The application collects input data 650 from users or other systems, processes it to the format expected by the model, and sends it to the model via the API. The model then performs the inference and sends the predictions back to the application. This application-layer integration ensures that the model can receive new data, process it appropriately, and provide outputs 650 in a way that is useful for the end-users or other systems.

To manage and maintain its performance, a deployed model may be continuously monitored to ensure it performs as expected over time. This involves tracking the model's prediction accuracy, response times, and other operational metrics. Additionally, the model may require retraining or updates based on new data or changing conditions in the environment it is applied in. This can be useful because machine learning models can drift over time due to changes in the underlying data they are making predictions on-a phenomenon known as model drift. Therefore, maintaining a machine learning model in a production environment often involves setting up mechanisms for performance monitoring, regular evaluations against new test data, and potentially periodic updates and retraining of the model to ensure it remains effective and accurate in making predictions.

V. Techniques for Feature Discovery Using Natural Language

Figure 7:
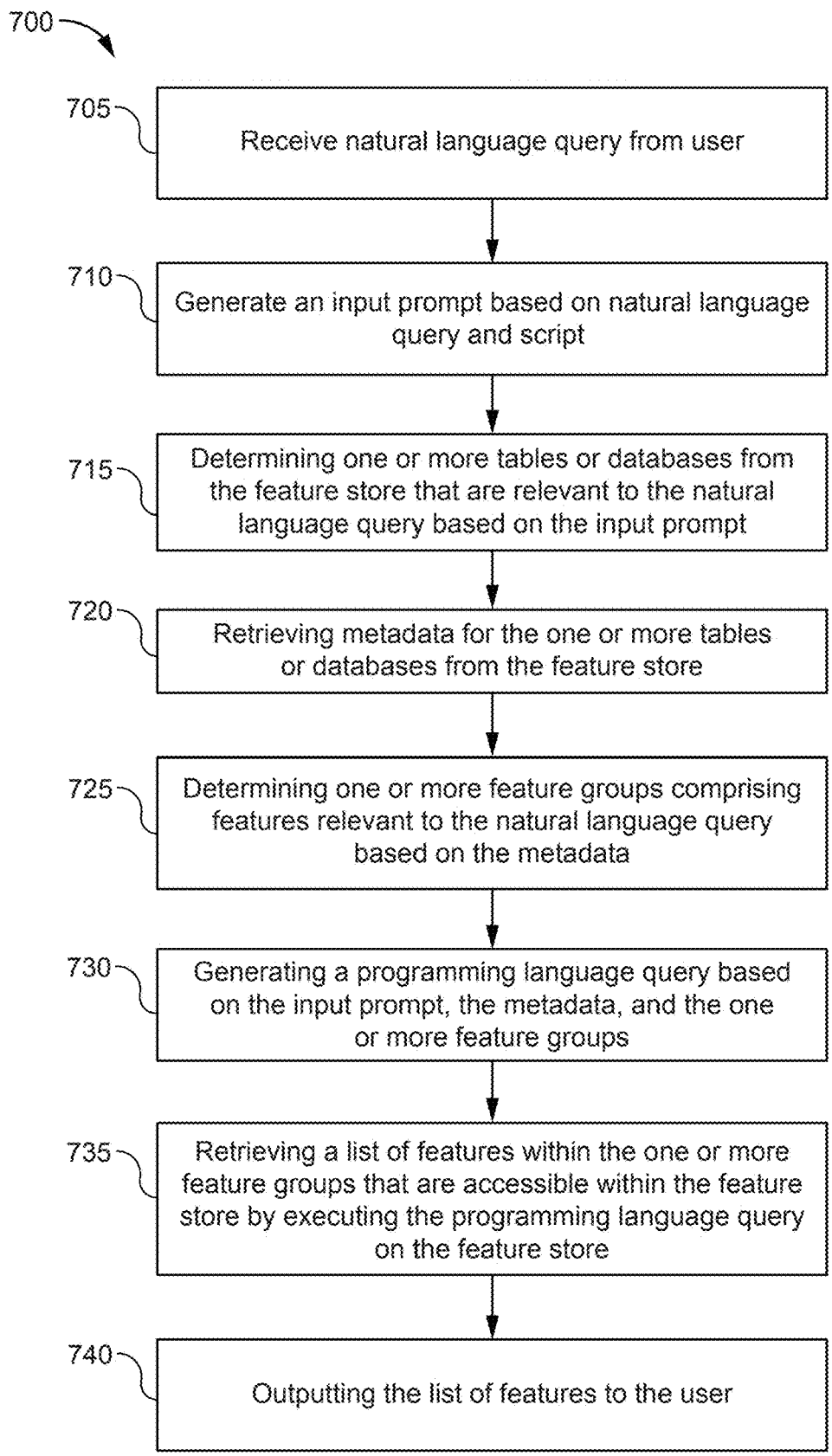
FIG. 7 shows an exemplary workflow for querying of features stored in a feature store using natural language queries according to various embodiments.

FIG. 7 shows an exemplary workflow 700 for querying of features stored in a feature store using natural language queries in accordance with various embodiments. The processing depicted in FIG. 7 may be implemented in software (e.g., code, instructions, program) executed by one or more processing units (e.g., processors, cores) of the respective systems, hardware, or combinations thereof (e.g., feature management system 100 and/or feature discovery system 400 described with respect to FIGS. 1 and 4A). The software may be stored on a non-transitory storage medium (e.g., on a memory device). The method presented in FIG. 7 and described below is intended to be illustrative and non-limiting. Although FIG. 7 depicts the various processing operations occurring in a particular sequence or order, this is not intended to be limiting. In certain alternative embodiments, the processing 700 may be performed in some different order or some operations may be performed at least partially in parallel.

At block 705, a natural language query for retrieving features from a feature store is received from a user.

At block 710, an input prompt is generated by appending text identifying the feature store to the natural language query. In some instances, the text appended to the input prompt is a script that comprises: identification of the LLM, identification of the feature store, and identification of a generator module that is implemented as part of the LLM and used to orchestrate extraction of the one or more tables or databases and metadata from the feature store.

At block 715, one or more tables or databases are determined, by LLM, from the feature store that are relevant to the natural language query based on the input prompt. At block 720, metadata for the one or more tables or databases is retrieved, by the LLM, from the feature store. At block 725, one or more feature groups comprising features relevant to the natural language query are determined, by the LLM, based on the metadata.

In some instances, the generator module comprises an algorithm or series of functional steps that are executed by the LLM to determine the one or more tables or databases from the feature store (715), retrieve the metadata for the one or more tables or databases from the feature store (720), and determining the one or more feature groups (725).

In some instances, executing the algorithm or series of functional steps comprises: (i) executing a first function that generates and executes, via a query runner function, one or more database queries on one or more databases for retrieval of a list of databases available within the feature store, the list of databases comprising the one or more databases; (ii) executing a second function that generates and executes, via the query runner function, one or more table queries on the one or more databases for retrieval of a list of tables available within the one or more databases, wherein the tables represent feature groups and/or datasets available within the one or more databases and the list of tables comprise the one or more tables; and (iii) executing a third function that generates and executes, via the query runner function, one or more table queries on the tables for retrieval of information about the tables and a list of features within each of the feature groups and/or datasets.

In some instances, the first function also gathers information about the databases, including the databases' structure, the metadata, and schemas, and wherein the third function also gathers information about the tables, including the tables' the metadata and schemas.

At block 730, a programming language query is generated, by the LLM, based on the input prompt, the metadata, and the one or more feature groups. In some instances, the programming language query is generated based on the input prompt, the metadata and the schemas for the databases, the metadata and schema for the tables, and the one or more feature groups.

At block 735, a list of features within the one or more feature groups that are accessible within the feature store is retrieved by executing the programming language query on the feature store.

At block 740, the list of features is output to the user. In some instances, the process further comprises training, validating, or implementing a machine learning model based on all or a portion of the features in the list of features. In some instances, the process further comprises retrieving a set of data from a database based on the list of features, and training, validating, or implementing a machine learning model using the set of data.

VI. Example Cloud Implementation

As noted above, infrastructure as a service (IaaS) is one particular type of cloud computing that can be used for providing the various techniques described herein. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
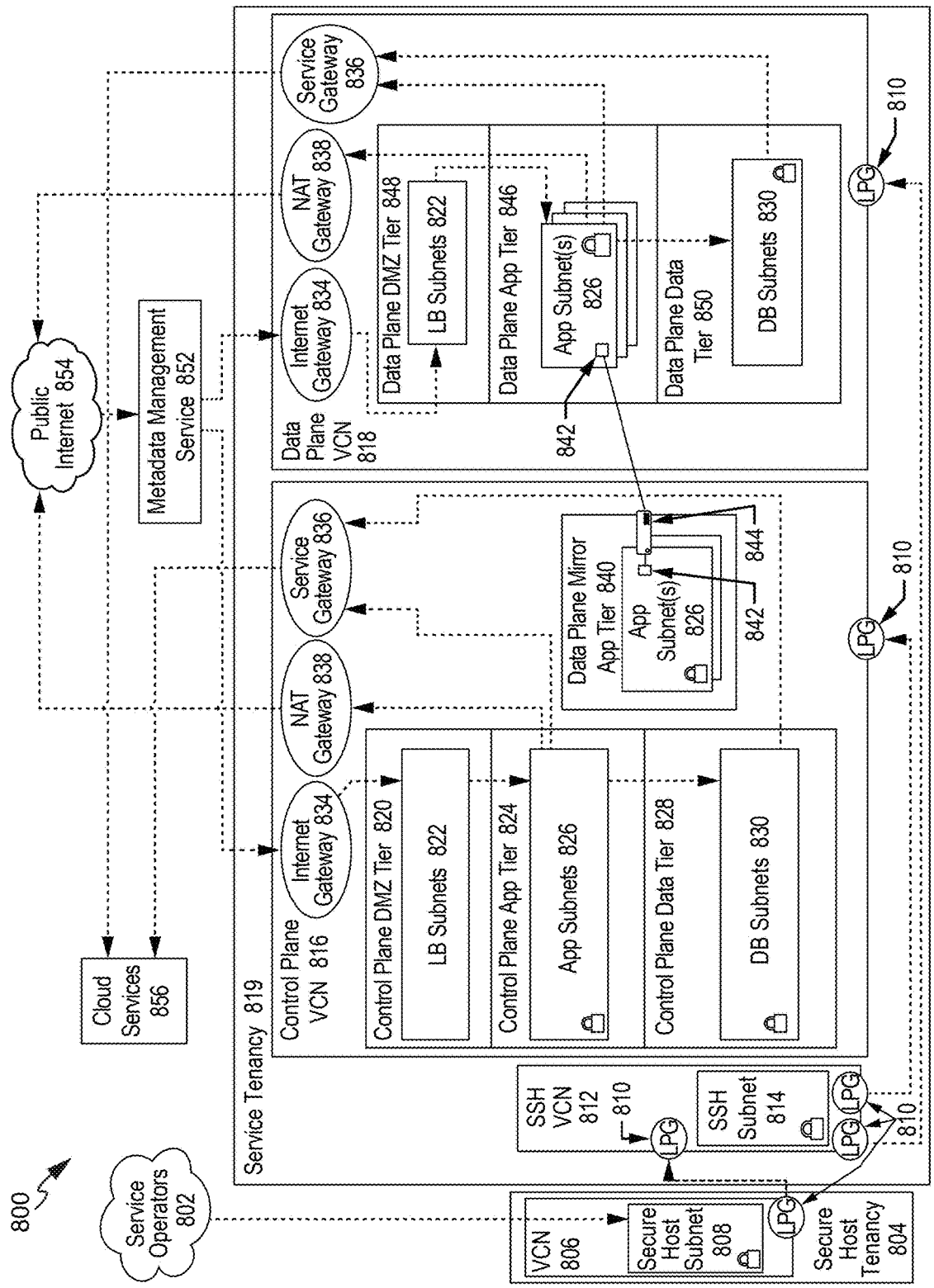
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively coupled to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
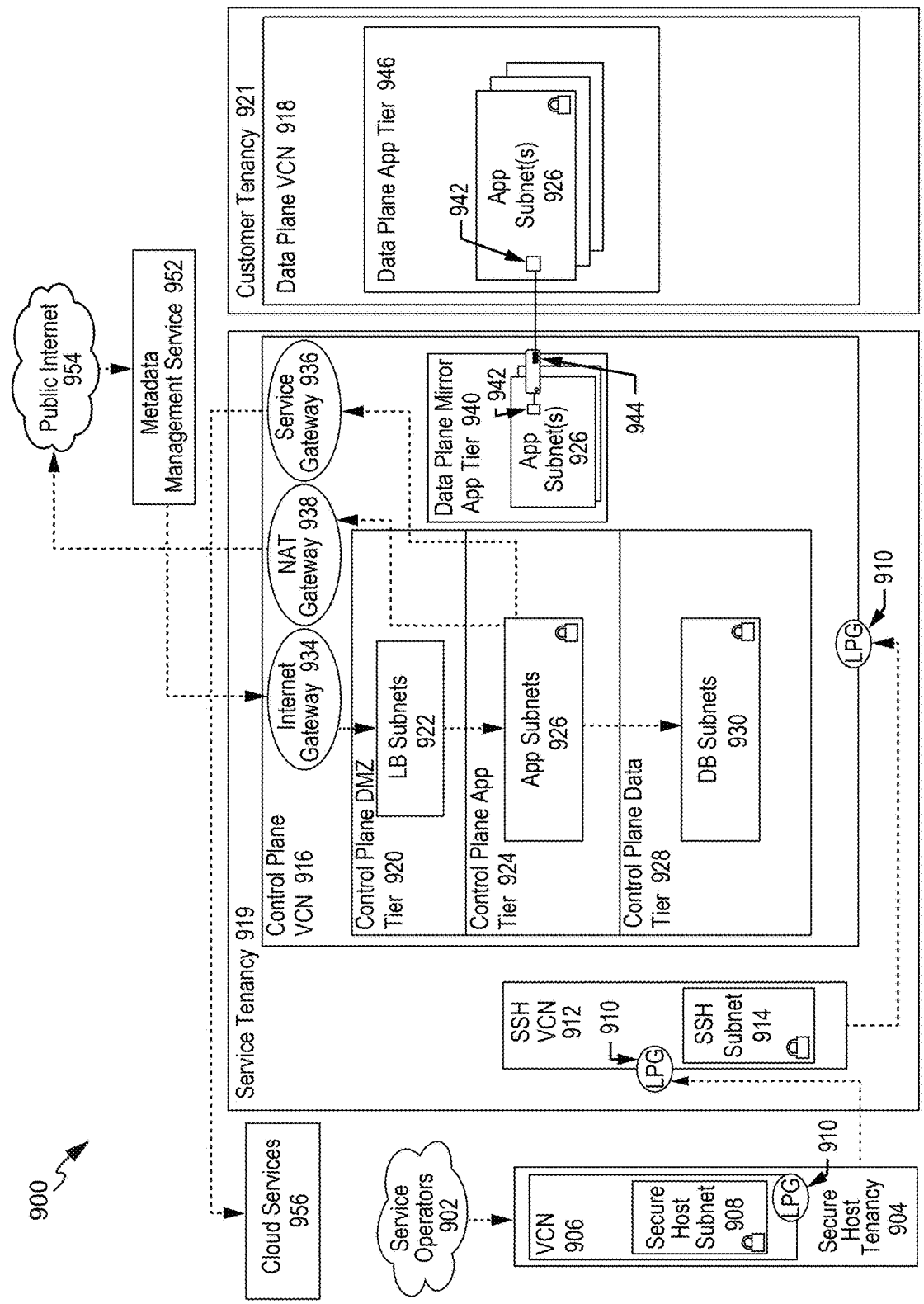
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively coupled to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
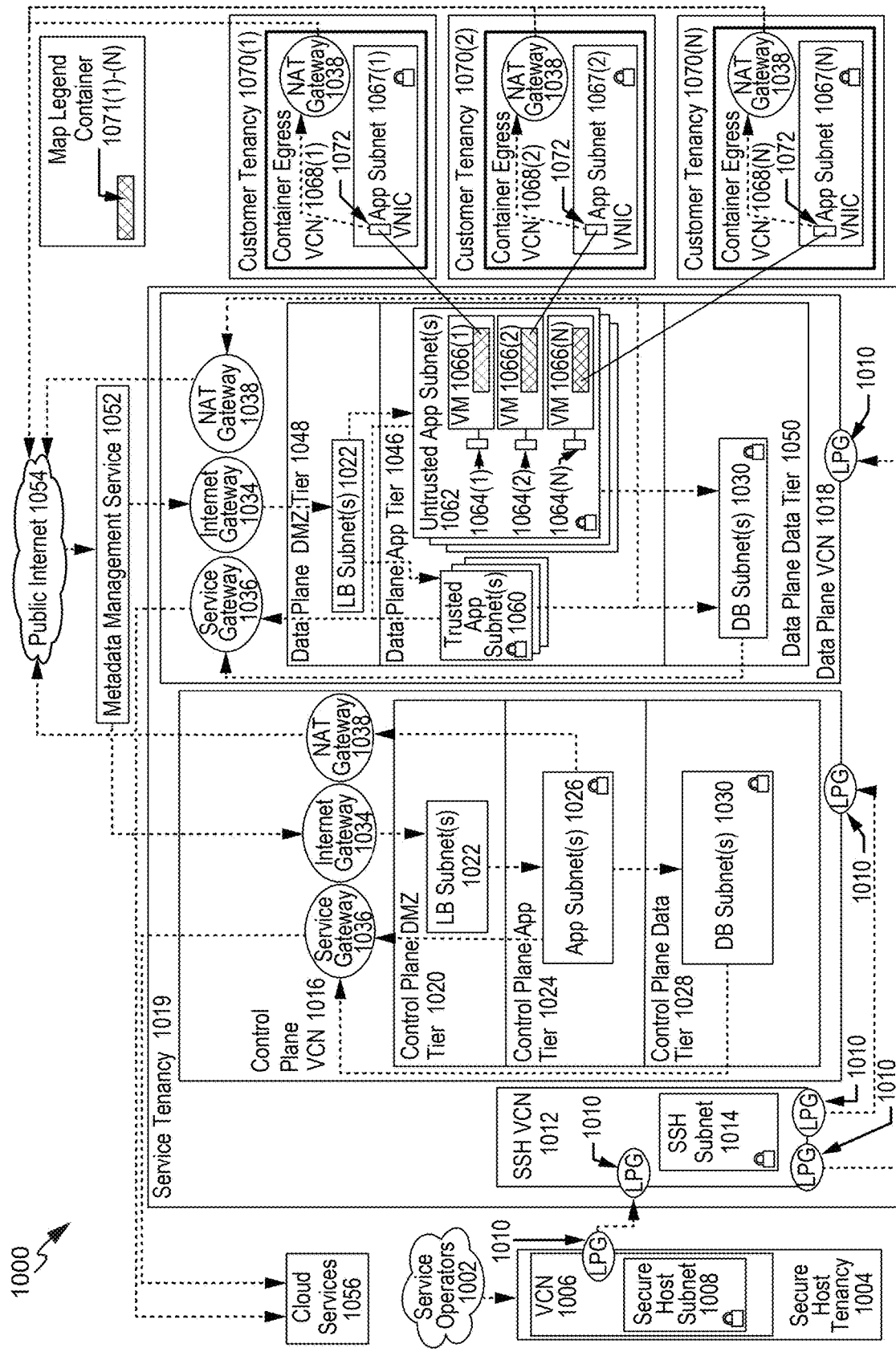
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
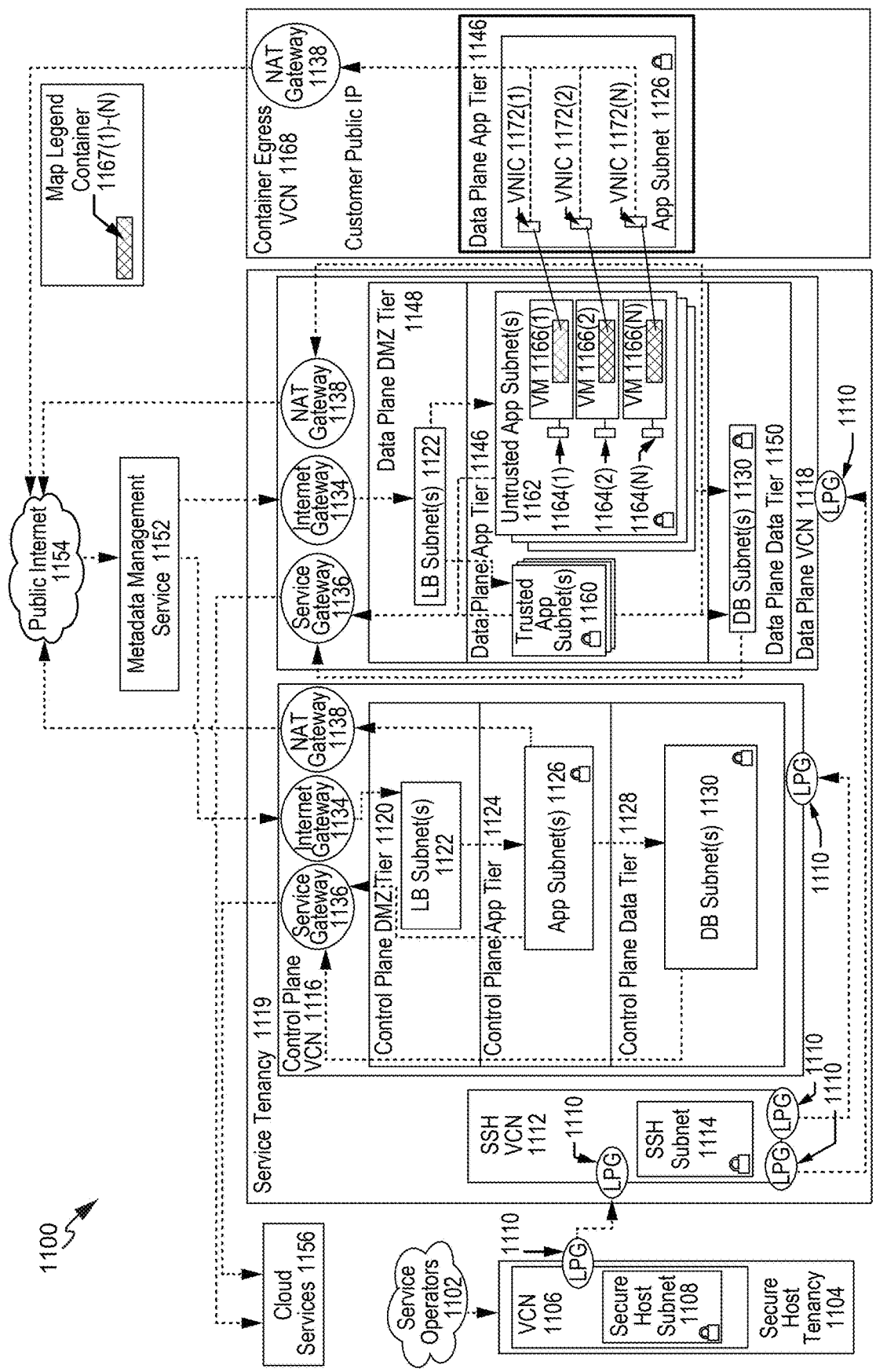
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively coupled to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
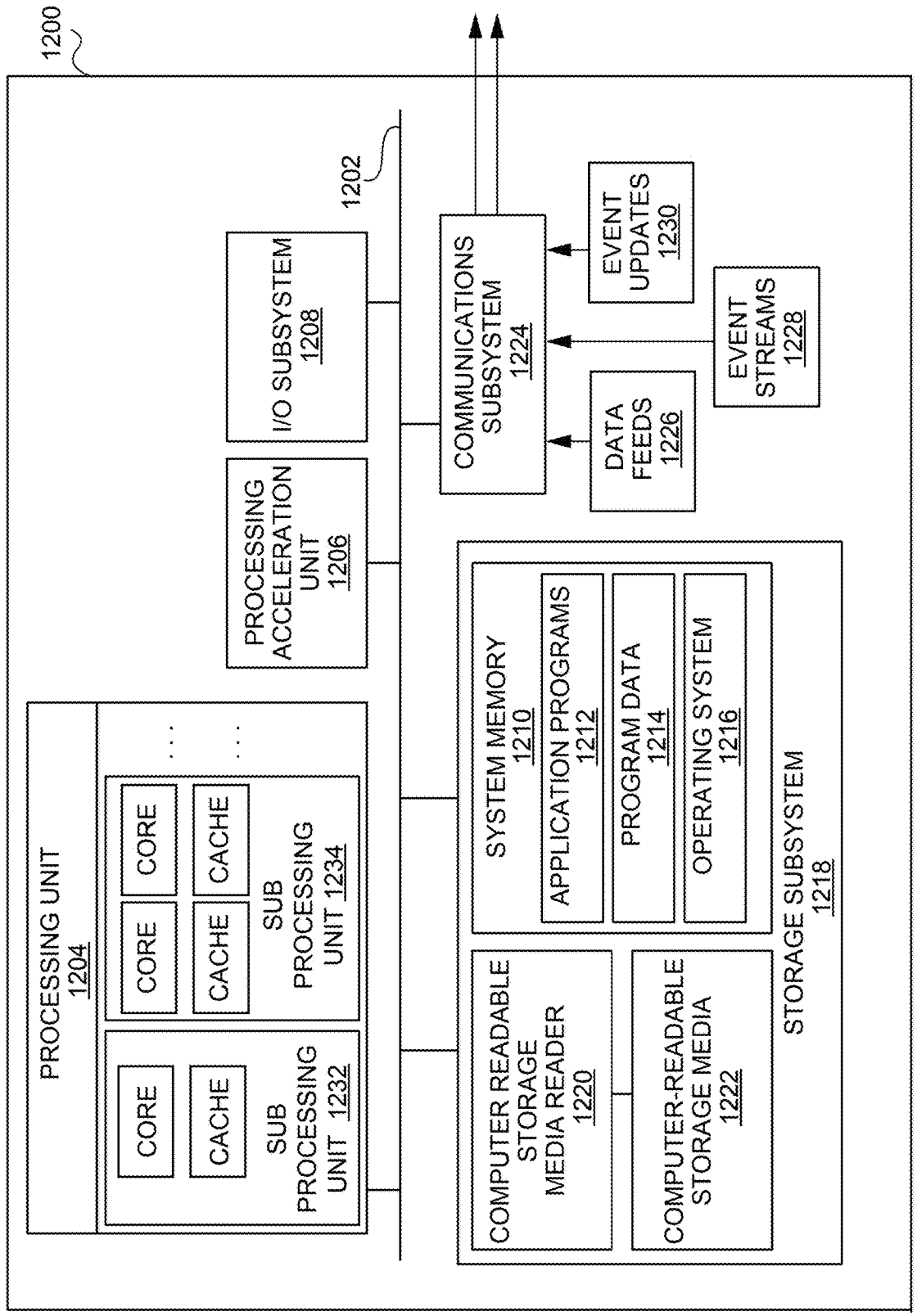
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
   receiving, from a user, a natural language query for retrieving features from a feature store;

generating an input prompt by appending text identifying the feature store to the natural language query;

determining, by a large language model (LLM), one or more tables or databases from the feature store that are relevant to the natural language query based on the input prompt;

retrieving, by the LLM, metadata for the one or more tables or databases from the feature store;

determining, by the LLM, one or more feature groups comprising features relevant to the natural language query based on the metadata;

generating, by the LLM, a programming language query based on the input prompt, the metadata, and the one or more feature groups;

retrieving a list of features within the one or more feature groups that are accessible within the feature store by executing the programming language query on the feature store; and outputting the list of features to the user.

2. The computer-implemented method of claim 1, further comprising:

training, validating, or implementing a machine learning model based on all or a portion of the features in the list of features; or retrieving a set of data from a database based on the list of features, and training, validating, or implementing a machine learning model using the set of data.

3. The computer-implemented method of claim 1, wherein the text appended to the input prompt is a script that comprises: identification of the LLM, identification of the feature store, and identification of a generator module that is implemented as part of the LLM and used to orchestrate the extraction of the one or more tables or databases and metadata from the feature store.

4. The computer-implemented method of claim 3, wherein the generator module comprises an algorithm or series of functional steps that are executed by the LLM to determine the one or more tables or databases from the feature store, retrieve the metadata for the one or more tables or databases from the feature store, and determining the one or more feature groups.

5. The computer-implemented method of claim 4, wherein executing the algorithm or series of functional steps comprises:

executing a first function that generates and executes, via a query runner function, one or more database queries on one or more databases for retrieval of a list of databases available within the feature store, the list of databases comprising the one or more databases;

executing a second function that generates and executes, via the query runner function, one or more table queries on the one or more databases for retrieval of a list of tables available within the one or more databases, wherein the tables represent feature groups and/or datasets available within the one or more databases and the list of tables comprise the one or more tables; and executing a third function that generates and executes, via the query runner function, one or more table queries on the tables for retrieval of information about the tables and a list of features within each of the feature groups and/or datasets.

6. The computer-implemented method of claim 5, wherein the first function also gathers information about the databases, including the databases' structure, the metadata, and schemas, and wherein the third function also gathers information about the tables, including the tables' the metadata and schemas.

7. The computer-implemented method of claim 6, wherein the programming language query is generated based on the input prompt, the metadata and the schemas for the databases, the metadata and schema for the tables, and the one or more feature groups.

8. A system comprising:

one or more processors; and one or more computer-readable media storing instructions which, when executed by the one or more processors, cause the system to perform operations comprising:

receiving, from a user, a natural language query for retrieving features from a feature store;

generating an input prompt by appending text identifying the feature store to the natural language query;

determining, by a large language model (LLM), one or more tables or databases from the feature store that are relevant to the natural language query based on the input prompt;

retrieving, by the LLM, metadata for the one or more tables or databases from the feature store;

determining, by the LLM, one or more feature groups comprising features relevant to the natural language query based on the metadata;

generating, by the LLM, a programming language query based on the input prompt, the metadata, and the one or more feature groups;

retrieving a list of features within the one or more feature groups that are accessible within the feature store by executing the programming language query on the feature store; and outputting the list of features to the user.

9. The system of claim 8, wherein the operations further comprise:

training, validating, or implementing a machine learning model based on all or a portion of the features in the list of features; or retrieving a set of data from a database based on the list of features, and training, validating, or implementing a machine learning model using the set of data.

10. The system of claim 8, wherein the text appended to the input prompt is a script that comprises: identification of the LLM, identification of the feature store, and identification of a generator module that is implemented as part of the LLM and used to orchestrate the extraction of the one or more tables or databases and metadata from the feature store.

11. The system of claim 10, wherein the generator module comprises an algorithm or series of functional steps that are executed by the LLM to determine the one or more tables or databases from the feature store, retrieve the metadata for the one or more tables or databases from the feature store, and determining the one or more feature groups.

12. The system of claim 11, wherein executing the algorithm or series of functional steps comprises:

executing a first function that generates and executes, via a query runner function, one or more database queries on one or more databases for retrieval of a list of databases available within the feature store, the list of databases comprising the one or more databases;

executing a second function that generates and executes, via the query runner function, one or more table queries on the one or more databases for retrieval of a list of tables available within the one or more databases, wherein the tables represent feature groups and/or datasets available within the one or more databases and the list of tables comprise the one or more tables; and executing a third function that generates and executes, via the query runner function, one or more table queries on the tables for retrieval of information about the tables and a list of features within each of the feature groups and/or datasets.

13. The system of claim 12, wherein the first function also gathers information about the databases, including the databases' structure, the metadata, and schemas, and wherein the third function also gathers information about the tables, including the tables' the metadata and schemas.

14. The system of claim 13, wherein the programming language query is generated based on the input prompt, the metadata and the schemas for the databases, the metadata and schema for the tables, and the one or more feature groups.

15. One or more non-transitory computer-readable media storing instructions which, when executed by one or more processors, cause a system to perform operations comprising:

receiving, from a user, a natural language query for retrieving features from a feature store;

generating an input prompt by appending text identifying the feature store to the natural language query;

determining, by a large language model (LLM), one or more tables or databases from the feature store that are relevant to the natural language query based on the input prompt;

retrieving, by the LLM, metadata for the one or more tables or databases from the feature store;

determining, by the LLM, one or more feature groups comprising features relevant to the natural language query based on the metadata;

generating, by the LLM, a programming language query based on the input prompt, the metadata, and the one or more feature groups;

retrieving a list of features within the one or more feature groups that are accessible within the feature store by executing the programming language query on the feature store; and outputting the list of features to the user.

16. The one or more non-transitory computer-readable media of claim 15, wherein the operations further comprise:

training, validating, or implementing a machine learning model based on all or a portion of the features in the list of features; or retrieving a set of data from a database based on the list of features, and training, validating, or implementing a machine learning model using the set of data.

17. The one or more non-transitory computer-readable media of claim 16, wherein the text appended to the input prompt is a script that comprises: identification of the LLM, identification of the feature store, and identification of a generator module that is implemented as part of the LLM and used to orchestrate the extraction of the one or more tables or databases and metadata from the feature store.

18. The one or more non-transitory computer-readable media of claim 17, wherein the generator module comprises an algorithm or series of functional steps that are executed by the LLM to determine the one or more tables or databases from the feature store, retrieve the metadata for the one or more tables or databases from the feature store, and determining the one or more feature groups.

19. The one or more non-transitory computer-readable media of claim 18, wherein executing the algorithm or series of functional steps comprises:

executing a first function that generates and executes, via a query runner function, one or more database queries on one or more databases for retrieval of a list of databases available within the feature store, the list of databases comprising the one or more databases;

executing a second function that generates and executes, via the query runner function, one or more table queries on the one or more databases for retrieval of a list of tables available within the one or more databases, wherein the tables represent feature groups and/or datasets available within the one or more databases and the list of tables comprise the one or more tables; and executing a third function that generates and executes, via the query runner function, one or more table queries on the tables for retrieval of information about the tables and a list of features within each of the feature groups and/or datasets.

20. The one or more non-transitory computer-readable media of claim 19, wherein the first function also gathers information about the databases, including the databases' structure, the metadata, and schemas, wherein the third function also gathers information about the tables, including the tables' the metadata and schemas, and wherein the programming language query is generated based on the input prompt, the metadata and the schemas for the databases, the metadata and schema for the tables, and the one or more feature groups.

\* \* \* \* \*